(12) United States Patent
Okamoto et al.

(10) Patent No.: US 8,775,019 B2
(45) Date of Patent: Jul. 8, 2014

(54) ACTIVE ANTI-VIBRATION SUPPORTING DEVICE AND ANTI-VIBRATION CONTROL METHOD FOR SAME

(75) Inventors: Hideyuki Okamoto, Saitama (JP);
Tetsuya Ishiguro, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 190 days.

(21) Appl. No.: 13/382,804

(22) PCT Filed: Jul. 5, 2010

(86) PCT No.: PCT/JP2010/061404
§ 371 (c)(1),
(2), (4) Date: Jan. 6, 2012

(87) PCT Pub. No.: WO2011/004792
PCT Pub. Date: Jan. 13, 2011

(65) Prior Publication Data
US 2012/0109457 A1     May 3, 2012

(30) Foreign Application Priority Data

Jul. 8, 2009  (JP) ................................. 2009-162161

(51) Int. Cl.
*G06F 17/00* (2006.01)
*G06F 19/00* (2011.01)
*F16F 15/00* (2006.01)

(52) U.S. Cl.
USPC ........... 701/36; 701/47; 701/111; 267/140.15

(58) Field of Classification Search
None
See application file for complete search history.

(56) References Cited

U.S. PATENT DOCUMENTS

| | | | |
|---|---|---|---|
| 5,304,908 A * | 4/1994 | Oh ................................. 318/629 |
| 6,254,069 B1 * | 7/2001 | Muramatsu et al. ..... 267/140.14 |
| 6,256,545 B1 * | 7/2001 | Kimura et al. ................... 700/28 |
| 2005/0006830 A1 | 1/2005 | Nemoto |
| 2005/0184214 A1 | 8/2005 | Mizushima et al. |
| 2009/0039577 A1 * | 2/2009 | Ishiguro et al. .......... 267/140.13 |
| 2010/0123498 A1 * | 5/2010 | Bae et al. ...................... 327/158 |

FOREIGN PATENT DOCUMENTS

| | | |
|---|---|---|
| CN | 1658101 A | 8/2005 |
| JP | 9-158980 A | 6/1997 |
| JP | 10-026181 A | 1/1998 |
| JP | 2001-271675 A | 10/2001 |
| JP | 2004-301297 A | 10/2004 |
| JP | 2005-003052 A | 1/2005 |
| JP | 2007-107579 A | 4/2007 |

\* cited by examiner

*Primary Examiner* — James Trammell
*Assistant Examiner* — Demetra Smith-Stewart
(74) *Attorney, Agent, or Firm* — Carrier Blackman & Associates, P.C.; Joseph P. Carrier; Michael J. McCandlish

(57) ABSTRACT

In an active anti-vibration supporting device (301), an ACM_ECU (200) for estimating an engine vibration state by using output data from a crank pulse sensor (Sa) and a TDC sensor (Sb) drives a driving unit (41) so as to extend and contract and thereby suppresses the transmission of vibration. The ACM_ECU (200) calculates the number of STGs ($S1_F$) that is a quotient obtained when dividing the phase delay ($P1_F$) of a target current value waveform by an average STG time ($(T1)/4$) in a first cycle (C1) of engine vibration and the remaining time ($P'1_F$) of the phase delay ($P1_F$), wherein the target current value waveform is used for suppressing the transmission of the engine vibration calculated using the output data from the crank pulse sensor (Sa) and the TDC sensor (Sb). The timing at which the elapse of the STG time equivalent to the number of STGs ($S1_F$) in a third cycle (C3) of the engine vibration in the driving timing of the driving unit has been detected is set as a phase delay reference. Further, after the remaining time ($P'1_F$) has elapsed, the target current value waveform is output.

9 Claims, 11 Drawing Sheets

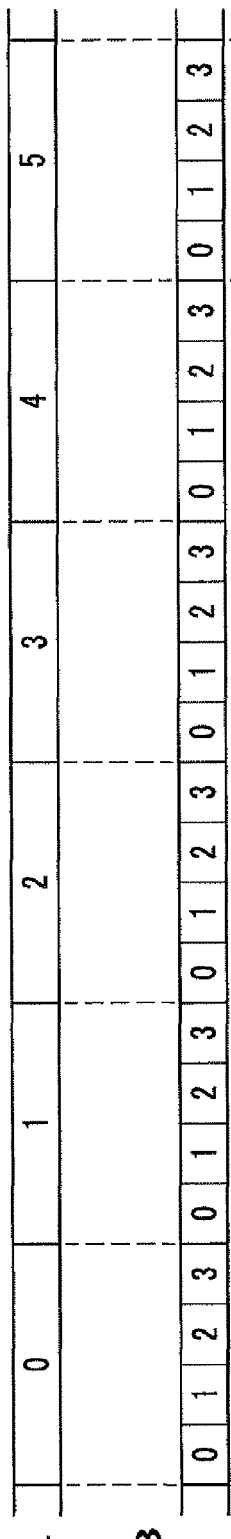
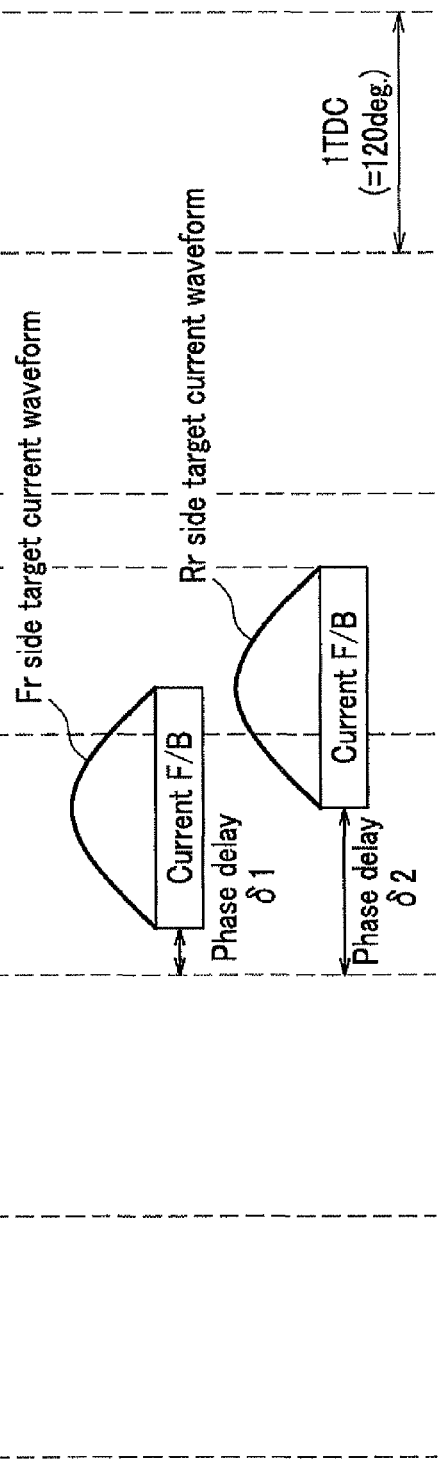
FIG.4A
FIG.4B
FIG.4C
FIG.4D

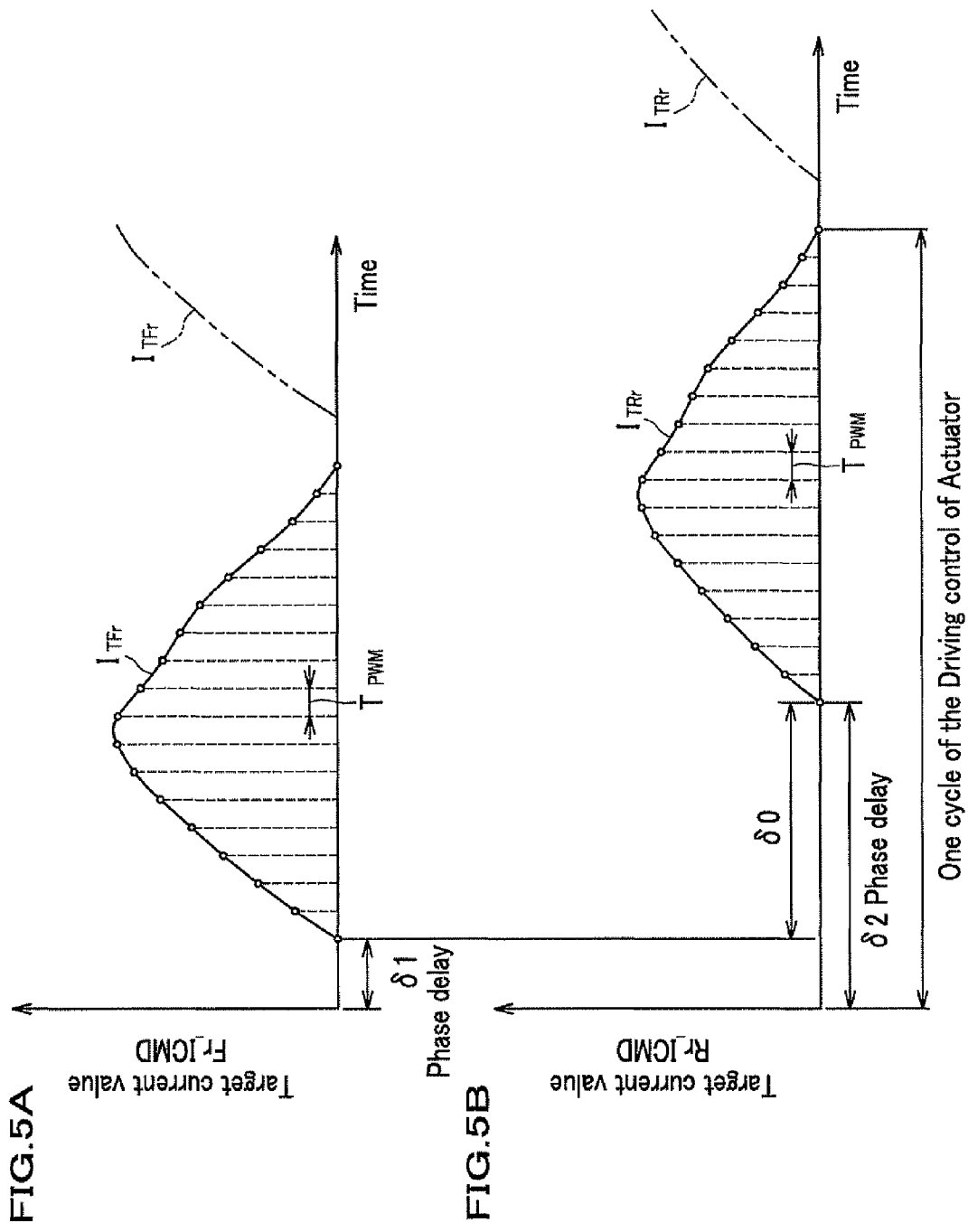

ACTIVE ANTI-VIBRATION SUPPORTING DEVICE AND ANTI-VIBRATION CONTROL METHOD FOR SAME

TECHNICAL FIELD

The present invention relates to an active anti-vibration supporting device which supports an engine of a vehicle in a vehicle body and a method for controlling the active anti-vibration supporting device.

BACKGROUND

Patent document 1 discloses a technique for an active anti-vibration supporting device. In a conventional technique disclosed in patent document 1, a target lift amount for a movable member of an actuator of an active control mount is calculated based on the output signals from an engine rotation speed sensor, a load sensor and an acceleration sensor in one vibration cycle of an engine. The duty ratio of a duty group for controlling driving current output to the actuator in the next vibration cycle is determined based on the calculated target lift amount. At this time, the phase delay which is the timing of the start point of the duty group is also determined.

Further, in the next cycle, the actuator of the active anti-vibration supporting device is driven based on the first, second and third duty groups corresponding to the vibration cycle lengths T1, T2, T3. When the engine rotation speed is increased and the cycle lengths T1, T2, T3 . . . are gradually shortened, current fed to the actuator is not eliminated at the end of the first, second and third duty groups, but the peak value of the current is gradually increased to prevent the active anti-vibration supporting device from achieving effective vibration-proofing functions, while generating possibility of heat generation at the actuator. In the conventional technique disclosed in patent document 1, the duty ratio for the second duty group is set at zero to stop energization to the actuator when the overlap quantity of the first and the second duty group exceeds a threshold.

PRIOR ART DOCUMENT

Patent Document

Patent document 1: Unexamined Japanese Patent Application Publication No. 2005-3052

SUMMARY OF THE INVENTION

Problems to be Solved by the Invention

In the technique disclosed in patent document 1, however, the duty ratio for the second duty group is set at zero to stop energization to the actuator when the overlap quantity of the first and the second duty group exceeds a threshold. As a result of this, in a plurality of consecutive engine vibration cycles, sometimes the current may not be output to the actuator, whereby the vibration control of the engine vibration can not be fully performed.

Moreover, if the engine rotation speed is increased, the phase delay which is the timing of the start point of the first duty group corresponding to the cycle length T1 of the engine vibration becomes different from the actual phase delay in the cycle length T3 of the engine vibration even though the phase delay which is the timing of the start point of the first duty group corresponding to the cycle length T1 of the engine vibration is the same as the actual phase delay in terms of the crank angle of the engine, because the phase delay is already converted to the phase delay on the time basis at the time when the duty group is generated. This causes a problem that an appropriate vibration control can not be performed.

In view of the above problems, an object of the present invention is to provide an active anti-vibration supporting device that can perform vibration proofing function for engine vibration without stopping the current supply to the actuator and a method performed by the active anti-vibration supporting device for controlling vibration.

Means to Solve the Problems

A first aspect of the present invention provides an active anti-vibration supporting device which supports an engine in a vehicle body and has a control unit which estimates vibration state based on an output from a sensor detecting a rotation variation of the engine and drives to extend or contract an actuator to suppress transmission of vibration. The control unit calculates a target current waveform for suppressing the transmission of the vibration of the engine by using output data from the sensor; divides a phase delay of the engine vibration calculated from the output data from the sensor by a first predetermined time determined by engine rotation speed to calculate its quotient and remainder time; and outputs the target current waveform after the remainder time is passed from a phase delay reference which is a second predetermined time according to the quotient and determined by the engine rotation speed at a timing for driving the actuator.

In accordance with the first aspect of the invention, the control unit divides a phase delay of the engine vibration calculated from the output data from the sensor by the first predetermined time determined by engine rotation speed to calculate its quotient and remainder time. The control unit then outputs the calculated target current waveform after the remainder time is passed from the phase delay reference which is the second predetermined time according to the quotient and determined by the engine rotation speed at the timing for driving the actuator. Thus, it is possible to output the target current waveform at an appropriate phase delay in accordance with the rotation variation of the engine, whereby the active anti-vibration supporting device can be appropriately controlled.

In the aforementioned active anti-vibration supporting device, the control unit further includes: a vibration state estimation unit which estimates an amplitude and a cycle of the engine vibration by using the output data from the sensor which detects the rotation variation of the engine; a target current calculation unit which calculates the target current waveform for driving the actuator based on the amplitude and the cycle estimated by the vibration state estimation unit; a phase delay calculation unit which calculates a phase delay of the engine vibration by using the amplitude estimated by the vibration state estimation unit and the output data from the sensor; a phase delay parameter calculation unit which divides the phase delay of the engine vibration calculated in the phase delay calculation unit by the first predetermined time determined by the engine rotation speed to calculate its quotient and remainder time; and a phase delay correction unit which outputs the calculated target current waveform after the remainder time is passed from the phase delay reference which is the second predetermined time according to the quotient and determined by the engine rotation speed in the timing for driving the actuator.

In accordance with the aforementioned active anti-vibration supporting device, the control unit estimates the amplitude and the cycle of the engine vibration by using the output data from the sensor which detects the rotation variation of the engine, and calculates the target current waveform for driving the actuator based on the estimated amplitude and the cycle.

The control unit calculates a phase delay of the engine vibration by using the estimated amplitude and the output data from the sensor and divides the phase delay of the engine vibration calculated in the phase delay calculation unit by the first predetermined time determined by the engine rotation speed to calculate its quotient and remainder time. The control unit then outputs the calculated target current waveform after the remainder time is passed from the phase delay reference which is the second predetermined time according to the quotient and determined by the engine rotation speed in the timing for driving the actuator. Thus, it is possible to output the target current waveform at an appropriate phase delay in accordance with the rotation variation of the engine, whereby the active anti-vibration supporting device can be appropriately controlled.

In the aforementioned active anti-vibration supporting device, the control unit includes a control unit which measures crank pulse signals from the sensor which are based on rotation of the engine; calculates in a second vibration cycle the target current waveform which is to be fed to the actuator for isolating vibration by using data of the crank pulse signals which belong to a first vibration cycle in cycles of the engine vibration, and drives to control the actuator by using the calculated target current waveform in a third vibration cycle.

In accordance with the active anti-vibration supporting device, the control unit includes the control unit which measures crank pulse signals from the sensor which are based on rotation of the engine; calculates in the second vibration cycle the target current waveform which is to be fed to the actuator for isolating vibration by using data of the crank pulse signals which belong to the first vibration cycle in cycles of the engine vibration, and drives to control the actuator by using the calculated target current waveform in a third vibration cycle. Thus, even with the limited calculation capability, the control unit obtains data of the crank pulse signals in the first vibration cycle, calculates in the second vibration cycle the target current waveform which is to be provided to the actuator, and at the time when an actuator is controlled to be driven by using the calculated target current waveform in the third vibration cycle, outputs the calculated target current waveform after the remainder time has elapsed from the phase delay reference which is the second predetermined time according to the quotient and determined by the engine rotation speed. Thus, it is possible to output the target current waveform at an appropriate phase delay in accordance with the rotation variation of the engine, whereby the active anti-vibration supporting device can be appropriately controlled.

In the aforementioned active anti-vibration supporting device, the control unit calculates in the second vibration cycle of the engine vibration a phase delay of the engine vibration in the first vibration cycle and the first predetermined time determined by the engine rotation speed by using data of the crank pulse signals which belong to the first vibration cycle of the engine vibration; divides the calculated phase delay of the engine vibration in the first vibration cycle by the first predetermined time determined by the engine rotation speed to calculate its quotient and remainder time, outputs in the third vibration cycle of the engine vibration, the calculated target current waveform after the remainder time is passed from the phase delay reference which is the second predetermined time according to the quotient and determined by the engine rotation speed.

In accordance with the aforementioned active anti-vibration supporting device, the control unit calculates in the second vibration cycle of the engine vibration the phase delay of the engine vibration in the first vibration cycle and the first predetermined time determined by the engine rotation speed by using data of the crank pulse signals which belong to the first vibration cycle of the engine vibration. The control unit then divides the calculated phase delay of the engine vibration in the first vibration cycle by the first predetermined time determined by the engine rotation speed to calculate its quotient and remainder time. Next, the control unit outputs, in the third vibration cycle, the calculated target current waveform after the remainder time is passed from the phase delay reference which is the second predetermined time according to the quotient and determined by the engine rotation speed. As a result, it is possible to output the target current waveform at an appropriate phase delay in accordance with the rotation variation of the engine, whereby the active anti-vibration supporting device can be appropriately controlled.

In the aforementioned active anti-vibration supporting device, the control unit calculates in the second vibration cycle of the engine vibration a phase delay of the engine vibration in the first vibration cycle and the first predetermined time determined by the engine rotation speed by using data of the crank pulse signals which belong to a first vibration cycle of the engine vibration; divides the calculated phase delay of the engine vibration in the first vibration cycle by the first predetermined time determined by the engine rotation speed to calculate its quotient and remainder time, in the third vibration cycle of the engine vibration, calculates a third predetermined time determined by the engine rotation speed, corrects the calculated remainder time by a ratio of the third predetermined time determined by the engine rotation speed and the first predetermined time determined by the calculated engine rotation speed, outputs the calculated target current waveform after the corrected remainder time is passed from the phase delay reference which is the second predetermined time according to the quotient and determined by the engine rotation speed.

In accordance with the aforementioned active anti-vibration supporting device, the control unit calculates in the second vibration cycle of the engine vibration the phase delay of the engine vibration in the first vibration cycle by using data of the crank pulse signals which belong to the first vibration cycle of the engine vibration. The control unit divides the calculated phase delay of the engine vibration in the first vibration cycle by the first predetermined time determined by the engine rotation speed to calculate its quotient and remainder time. Then the control unit in the third vibration cycle of the engine vibration calculates a third predetermined time determined by the engine rotation speed, corrects the calculated remainder time by a ratio of the third predetermined time determined by the engine rotation speed and the first predetermined time determined by the calculated engine rotation speed. After that the control unit outputs the calculated target current waveform after the corrected remainder time is passed from the phase delay reference which is the second predetermined time according to the quotient and determined by the engine rotation speed. As a result, it is possible to output the target current waveform at an appropriate phase delay in accordance with the rotation variation of the engine, whereby the active anti-vibration supporting device can be appropriately controlled.

In the aforementioned active anti-vibration supporting device, the first predetermined time determined by the engine rotation speed corresponds to a value obtained by dividing the cycle of the engine vibration by a predetermined integral number, and the second predetermined time according to the quotient and determined by the engine rotation speed corresponds to time taken for detecting a predetermined number of crank pulse signals.

For example, time taken for the crank shaft to rotate in 120 degrees in the case of V-8 cylinder engine or in 180 degrees in the case of in-line four cylinder engine corresponds to the engine vibration cycle, and the phase delay of the engine vibration is varied in correspondence with the engine vibration cycle.

Thus, in accordance with the aforementioned active anti-vibration supporting device, the first predetermined time determined by the engine rotation speed can be adapted to correspond to a value obtained by dividing the cycle of the engine vibration by a predetermined integral number. For example, relative to the crank angle corresponding to the engine vibration cycle determined by the type of the engine, the first predetermined time can be adapted to correspond to the time taken for the crank shaft to rotate in a crank angle shorter than the phase delay of the engine vibration experimentally obtained in advance and obtained by dividing the crank angle corresponding to the cycle of the engine vibration by an integral number (hereinafter, referred to as "a crank angle corresponding to one stage"). As a result, it is possible to detect the second predetermined time according to the quotient and determined by the engine rotation speed as time taken for detecting a predetermined number of crank pulse signals. Thus, the second predetermined time according to the quotient and determined by the engine rotation speed can be detected as time taken for the crank shaft to rotate in the crank angle corresponding to the one stage at the timing when the actuator is driven. As a result, the phase delay of the engine vibration calculated by using the amplitude of the vibration estimated by the control unit estimating the vibration state and output data from the sensor can be changed to the actual phase delay of the engine vibration at the timing when the actuator is driven.

A second aspect of the present invention provides a method performed in an active anti-vibration supporting device for controlling vibration isolation, comprising steps of: in one cycle of engine vibration cycles which are repeated in a cyclic manner, reading in the one cycle an output value of a sensor which detects a rotation variation of an engine; calculating in the next cycle a target current waveform which is fed to an actuator for isolating the vibration and a temporarily-set phase delay time based on the output value from the sensor which has been read in the one cycle; outputting in a cycle after the next cycle current corresponding to the target current waveform calculated in the next cycle to suppress the vibration of the engine; wherein the steps are cyclically performed repeatedly, and the method further comprising a step of adjusting based on acceleration and deceleration of a rotation speed of the engine a phase delay by which an output timing of the current corresponding to the target current waveform is determined in the step of outputting the current in each cycle by dividing the each cycle in stages of which number is n, and wherein in the step of calculating the target current waveform, the time length of the cycle in which the step of reading the output value of the sensor is performed is divided by the number n which is the number of stages dividing the cycle in order to calculate an average time length of one stage at the time when the step of reading the output value of the sensor is performed, and the calculated temporarily-set phase delay is divided by the calculated average time length of the one stage to calculate its quotient which is the number of stages and a remainder which is a remainder time, and in the step of outputting the current, the phase delay in the step of outputting the current is made to be a time after time of stages indicated by the number of stages which belong to the cycle in which the outputting step is performed and the remainder time are passed.

In accordance with the aforementioned method, in a phase delay adjusting step in which the phase delay determining the output timing of the current corresponding to the target current waveform in the output step of each cycle can be adjusted based on the acceleration or deceleration of the engine speed, the active anti-vibration supporting device makes the phase delay to be the time after the time of the stages of the stage number belonging to the cycle in which the output process is performed and the remainder time are passed. Therefore, the phase delay can be easily adjusted. As a result, it is possible to output the target current waveform at an appropriate phase delay in accordance with the rotation variation of the engine, whereby the active anti-vibration supporting device can be appropriately controlled.

In the aforementioned method, in the step of outputting the current, the remainder time calculated in the step of calculating the target current waveform is corrected by a ratio between a time length of a first stage which belongs to the cycle in which the step of outputting the current is performed and the calculated average time length of the one stage at the time when the step of reading the output value of the sensor is performed, and the phase delay in the step of outputting the current is made to be a time after time of the stages of the number of stages belonging to the cycle in which the step of outputting the current is performed and the corrected remainder time are passed.

In accordance with the aforementioned method, in a phase delay adjusting step in which the phase delay which determines the output timing of the current corresponding to the target current waveform in the output step of each cycle can be adjusted based on the acceleration or deceleration of the engine speed, the active anti-vibration supporting device corrects the remainder time calculated in the calculation step. As a result, the aforementioned method can more accurately adjust the phase delay. Thus, it is possible to output the target current waveform at an appropriate phase delay in accordance with the rotation variation of the engine, whereby the active anti-vibration supporting device can be appropriately controlled.

Effect of the Invention

In accordance with the present invention, there are provided an active anti-vibration supporting device which can exert the anti-vibration function against the engine vibration without stopping supplying electricity to the actuator and method performed by the active anti-vibration supporting device for controlling to isolate vibration.

BRIEF DESCRIPTION OF THE DRAWINGS

FIGS. 4A to 4D are illustrations describing the calculation cycles for the ACM control performed by the micro computer of the ACM_ECU in synchronization with the TDC pulse signal and the crank pulse signal; FIG. 4A is a time chart for cycles of the calculation process; FIG. 4B is a timing chart describing a method for dividing each calculation process cycle in four stages STG based on the crank pulse signal; FIG. 4C is a timing chart describing contents of the calculation process in the consecutive two calculation cycles which follow the cycle of CUCYL=0 based on the crank pulse signal obtained in the cycle of CUCYL=0 shown in FIG. 4A; and FIG. 4D is a timing chart describing the feed back control for the output current corresponding to the target current waveform.

FIGS. 5A and 5B illustrate a target current waveform for the active control mount $M_F$, $M_R$ at the timing for driving an actuator; FIG. 5A is an illustration for explaining the target current waveform $I_{TFr}$ for the active control mount $M_F$; and FIG. 5B is an illustration for explaining the target current waveform $I_{TRr}$ (b) for the active control mount $M_R$.

FIG. 7A is a correspondence relationship of the time chart in the crank pulse signal and the cycle of the engine vibration; FIG. 7B is a time chart for the calculation cycle; and FIG. 7C is an illustration for explaining the process of adjusting the phase delay when the front side target current waveform is output.

EMBODIMENT FOR CARRYING OUT THE INVENTION

An embodiment of the present invention is described in detail below with reference to the accompanying drawings.
<Configuration of Active Anti-Vibration Supporting Device>

Figure 1:
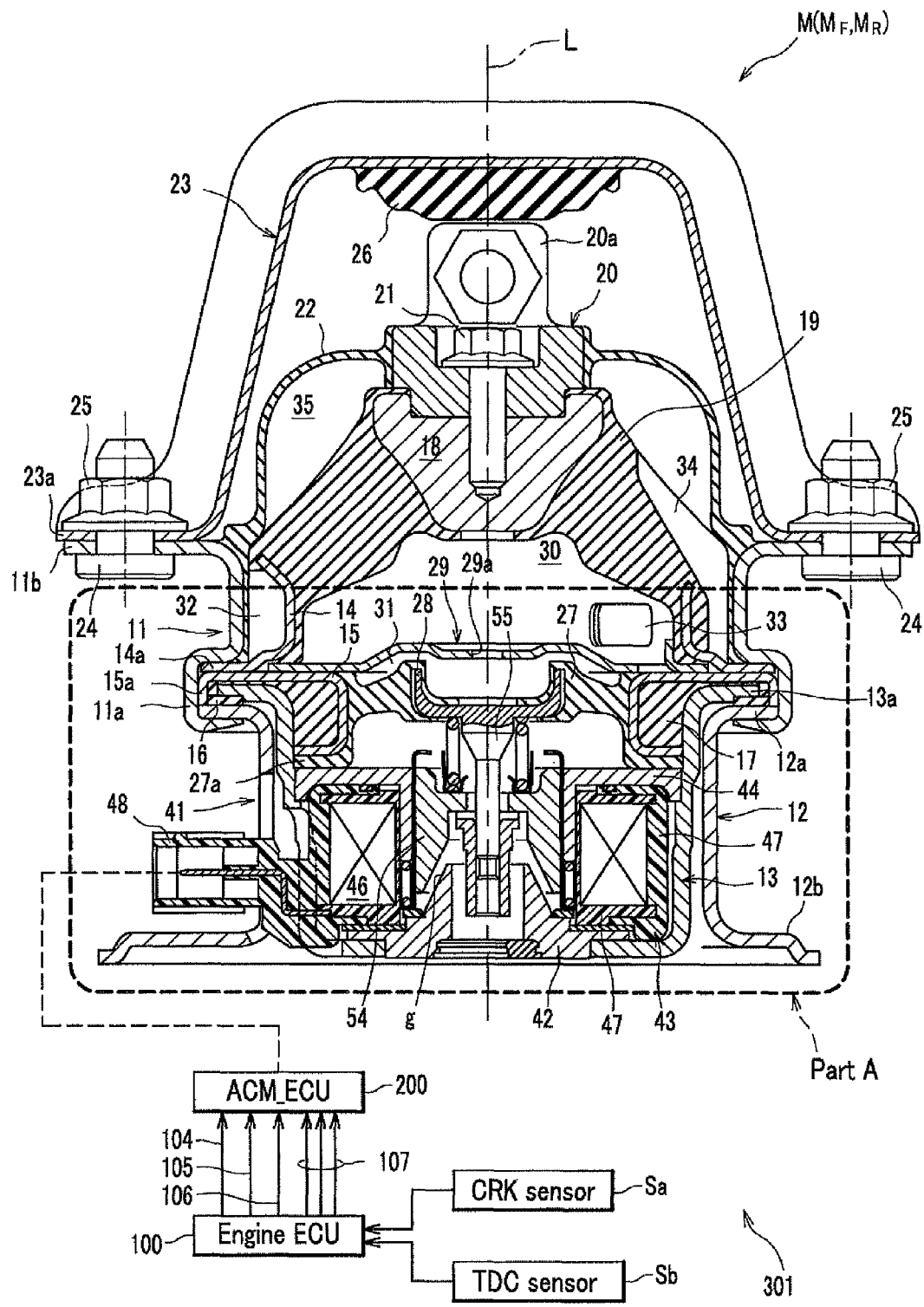
FIG. 1 is a vertical cross sectional view showing a structure of an active control mount of an active anti-vibration supporting device of an embodiment of the present invention.
Figure 2:
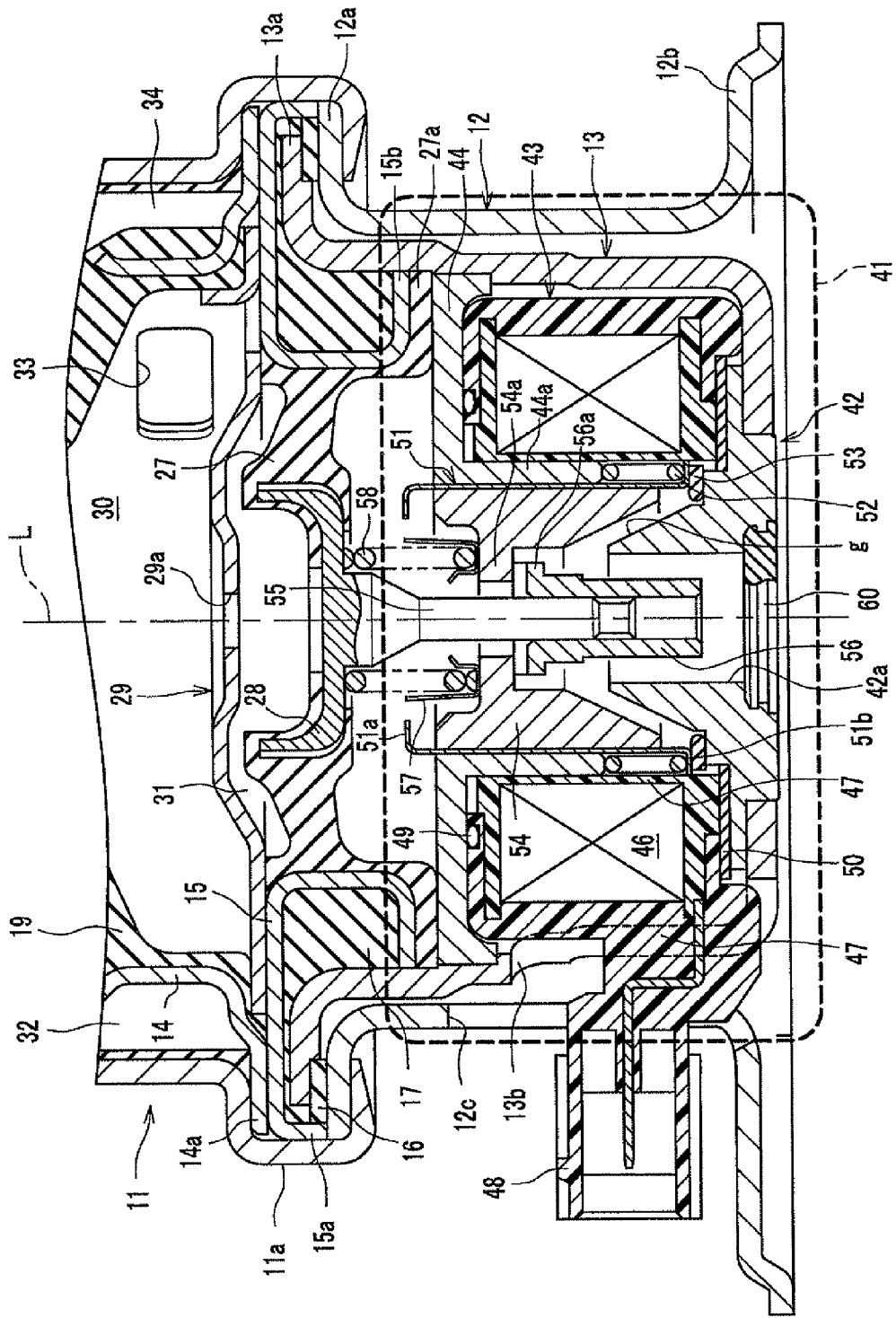
FIG. 2 is an enlarged view of the part A shown in FIG. 1.

FIG. 1 is a vertical sectional view showing a configuration of an active control mount of an active anti-vibration supporting device according to the embodiment of the present invention. FIG. 2 is an enlarged view of the part A shown in FIG. 1.

An active anti-vibration supporting device 301 according to the first embodiment can be driven to extend and contract in a vertical direction, and includes active control mounts (active mounts) $M_F$, $M_R$ which are used to elastically support an engine of a vehicle in a vehicle body frame and are disposed ahead of and behind the engine.

Hereinafter, "active control mounts $M_F$, $M_R$" are just referred to as an "active control mount M" when it is not necessary to distinguish between the active control mounts $M_F$, $M_R$.

Here, the engine is a so-called side-ways mounted transversal V engine with six-cylinders in which one end of a crankshaft (not shown) is connected to a transmission, and the crankshaft is disposed in a direction transverse to a body of the vehicle. Therefore, the engine is disposed such that the direction of the crankshaft is in a direction transverse to a body of the vehicle V, and the anti-vibration supporting units $M_F$ and $M_R$ are disposed ahead of and behind the engine 102 as a pair to reduce a roll vibration caused by the engine.

The active control mounts $M_F$, $M_R$ are mounted on a location below the center of gravity of the engine to reduce the roll vibration in a front-rear direction of the engine and to elastically support the engine in the vehicle body of the vehicle.

As shown in FIG. 1, the anti-vibration supporting units 301 includes an active control mount control ECU 200A which controls the active mounts M, M (in FIG. 1, only one active mount M is representatively shown). Hereinafter, the active control mount control ECU 200A (control unit) is referred to as an "ACM_ECU 200A". The ACM_ECU 200A is connected to an engine control ECU (hereinafter, referred to as an "engine ECU") 100 which controls revolution speed Ne or output torque, etc. via a CAN communication line, or the like.

The ACM_ECU 200 corresponds to a "control unit" recited in claims.
<Configuration of ACM>

As shown in FIG. 1, an active control mount M has a structure that is substantially symmetrical with respect to an axis $L_A$, and includes a substantially cylindrical upper housing 11, a substantially cylindrical lower housing 12 disposed below the housing 11, an upwardly opening substantially cup-shaped actuator case 13 housed in the lower housing 12, a diaphragm 22 connected on the upper housing 11, an annular first elastic body support ring 14 housed in the upper housing 11, a first elastic body 19 connected on the first elastic body support ring 14, an annular second elastic body support ring 15 housed in the actuator case 13, a second elastic body 27 connected to an inner peripheral side of the second elastic body support ring 15, and a driving unit (actuator) 41 housed in the actuator case 13 and disposed below the second elastic body support ring 15 and the second elastic body 27.

Between a flange unit 11a at the lower end of the upper housing 11 and a flange unit 12a at the upper end of the lower housing 12, a flange unit 13a on the outer periphery of the actuator case 13, an outer peripheral unit 14a of the first elastic body support ring 14, and an upper and outer peripheral unit 15a of a second elastic body support ring 15 are superimposed and joined by crimping. In this process, an annular first floating rubber 16 is disposed between the flange unit 12a and the flange unit 13a, and an annular second floating rubber 17 is disposed between an upper side of the flange unit 13a and lower side of the upper and outer peripheral unit 15a, so that the actuator case 13 is floatingly supported such that it can move up and down relative to the upper housing 11 and the lower housing 12.

The first elastic body support ring 14, and a first elastic body support boss 18 disposed in a concave unit provided on the upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt 21. An outer peripheral unit of a diaphragm 22 whose inner peripheral unit is joined by vulcanization bonding to the diaphragm support boss 20, is joined by vulcanization bonding to the upper housing 11.

An engine mounting unit 20a integrally formed with an upper face of the diaphragm support boss 20 is fixed to the engine. (Detailed method for fixing is not shown.) Also, a vehicle body mounting unit 12b at the lower end of the lower housing 12 is fixed to the vehicle body frame (not shown).

A flange unit 23a at the lower end of a stopper member 23 is joined to a flange unit 11b by bolts 24 and nuts 25 at the upper end of the upper housing 11. The engine mounting unit 20a provided on the diaphragm support boss 20 faces a stopper rubber 26 attached to an upper inner face of the stopper member 23 so that the engine mounting unit 20a can touch the stopper rubber 26.

By such a structure, when a large load is input from the engine to the active control mount M, the engine mounting unit 20a touches the stopper rubber 26, thereby reducing excessive displacement of the engine.

An outer peripheral unit of a second elastic body 27 made of a membranous rubber is joined to the inner peripheral face of the second elastic body support ring 15 by vulcanization bonding. At a center portion of the second elastic body 27, a movable member 28 is joined by vulcanization bonding so that the upper unit thereof is embedded in.

A disc-shaped partition member 29 is fixed between an upper face of the second elastic body support ring 15 and the lower unit of the first elastic body support ring 14. A first liquid chamber 30 defined by the first elastic body support ring 14, the first elastic body 19 and the partition member 29, and a second liquid chamber 31 defined by the partition member 29 and the second elastic body 27, communicate with each other via a through hole 29a formed in the center of the partition member 29.

The outer peripheral unit 27a of the second elastic body 27 is held between a lower and outer peripheral unit 15b of the second elastic body support ring 15 (see FIG. 2) and a yoke 44 described below to function as a seal.

Also, an annular through passage 32 is formed between the first elastic body support ring 14 and the upper housing 11. The through passage 32 communicates with the first liquid chamber 30 via a through hole 33, and communicates via a through gap 34 with a third liquid chamber 35 defined by the first elastic body 19 and the diaphragm 22.

As shown in FIG. 2, the coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c formed in the actuator case 13 and the lower housing 12 and extending outward, and an electric supply line is connected to the connector 48 to supply electric power to the coil 46.

The yoke 44 has an annular flange on the upper side of the coil cover 47, and has a cylindrical unit 44a extending downward from the inner peripheral unit of the flange. The yoke 44 has, as it were, a configuration of cylinder having flange. A seal 49 is disposed between an upper face of the coil cover 47 and a lower face of the annular flange of the yoke 44. A seal 50 is disposed between a lower face of the coil cover 47 and an upper face of the stationary core 42. These seals 49 and 50 can prevent water or dust from entering an internal space of the driving unit 41 via the openings 13b and 12c formed in the actuator case 13 and the lower housing 12.

A thin cylindrical bearing member 51 is fitted, in a vertically slidable manner, into an inner peripheral face of a cylindrical unit 44a of the yoke 44. An upper flange 51a and a lower flange 51b are formed at the upper end and the lower end respectively of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 by the lower flange 51b being pressed against the upper face of the stationary core 42 via an elastic body 53 disposed between the lower face of the lower flange 51b and the stationary core 42 by means of an elastic force of the set spring 52.

A substantially cylindrical movable core 54 is fitted, in a vertically slidable manner, into an inner peripheral face of the bearing member 51. Further, the stationary core 42 and the movable core 54 have hollow center portions on the axis L respectively, and a substantially cylindrical rod 55, which connects to the center of the movable member 28 (on the axis L) and extends downwardly, is inserted there. A nut 56 is tightened around the lower end of the rod 55. The nut 56 has a hollow part at its center, the upper end of the hollow part opens upward, and receives the lower end of the rod 55 in the hollow part. An upper end 56a of the nut 56 has a slightly larger outer diameter than that of its lower portion. An upper face of the upper end 56a touches the lower face of the spring washer 54a.

Also, a set spring 58 is disposed in a compressed state between the spring washer 54a of the movable core 54 and a lower face of the movable member 28. The lower face of the spring washer 54a of the movable core 54 is fixed by being pressed against the upper end 56a of the nut 56 by means of an elastic force of the set spring 58. In this state, the conical inner peripheral unit of the cylindrical unit of the movable core 54 and the conical outer peripheral unit of the stationary core 42 face each other across a conical air gap g.

Relative to the rod 55, the nut 56 is tightened in an opening 42a formed in the center of the stationary core 42 with position adjustment in vertical direction. This opening 42a is blocked by a rubber cup 60.

<Operation of Active Control Mount>

A coil 46 of the driving unit 41 is excited by power supply control from the ACM_ECU 200A so as to move a movable core 54 by sucking force to move a movable member 28 downward. Associated with movement of this movable member 28, a second elastic body 27 which defines a second liquid chamber 31 is downwardly deformed so as to increase the capacity of the second liquid chamber 31. Conversely, when the coil 46 is demagnetized, the second elastic body 27 is upwardly deformed by elastic deformation of itself, the movable member 28 and the movable core 54 move upwardly, and the capacity of the second liquid chamber 31 decreases.

A low frequency engine shake vibration (e.g., 7-20 Hz) is caused by a resonance between the vehicle body and the engine system in a coupled system including the engine, the vehicle body, and a suspension. When the low frequency engine shake vibration occurs while the vehicle is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set such that a low spring constant and high attenuation force are exhibited in the frequency region of the engine shake vibration. Therefore, it is possible to effectively reduce the vibration transmitted from the engine 102 to the vehicle body frame.

Further, in the frequency region of the engine shake vibration, when the engine 102 is in a steady rotating state, the driving unit 41 is maintained in a non-operating state.

When vibration occurs which has a higher frequency than that of the above-mentioned engine shake vibration, that is, vibration during idling or vibration during selective-cylinder operation due to rotation of crankshaft (not shown) of the engine, the liquid within the through passage 32 providing communication between the first liquid chamber 30 and the third liquid chamber 35 becomes stationary and a vibration isolating function cannot be exhibited. Therefore, the driving units 41 of the active control mounts $M_F$, $M_R$ are driven to exhibit a vibration isolating function.

For reference's sake, the idle vibration is caused by low-frequency vibrations of a floor, seats, and a steering wheel during idling. For example, BURUBURU vibration is caused in a four-cylinder engine in a range of 20-35 Hz, and in a six-cylinder engine in a range of 30-50 Hz, and YUSAYUSA vibration is caused in a range of 5-10 Hz by uneven combustion, and the main factor of the YUSAYUSA vibration is roll vibration in the engine.

In order to drive driving units 41, 41, in an active anti-vibration supporting device 301 including the active control mounts $M_F$, $M_R$ shown in FIG. 1, an ACM_ECU200 calculates a target current waveform in the micro computer 200b of the ACM_ECU200 (see FIG. 3) based on signals from a crank pulse sensor (a sensor for detecting the rotation change of the engine) Sa (shown as a "CRK sensor Sa" in FIG. 1 and referred to as a "CRK sensor Sa" hereinafter) and from a TDC sensor (a sensor for detecting the rotation change of the engine) Sb.

Figure 3:
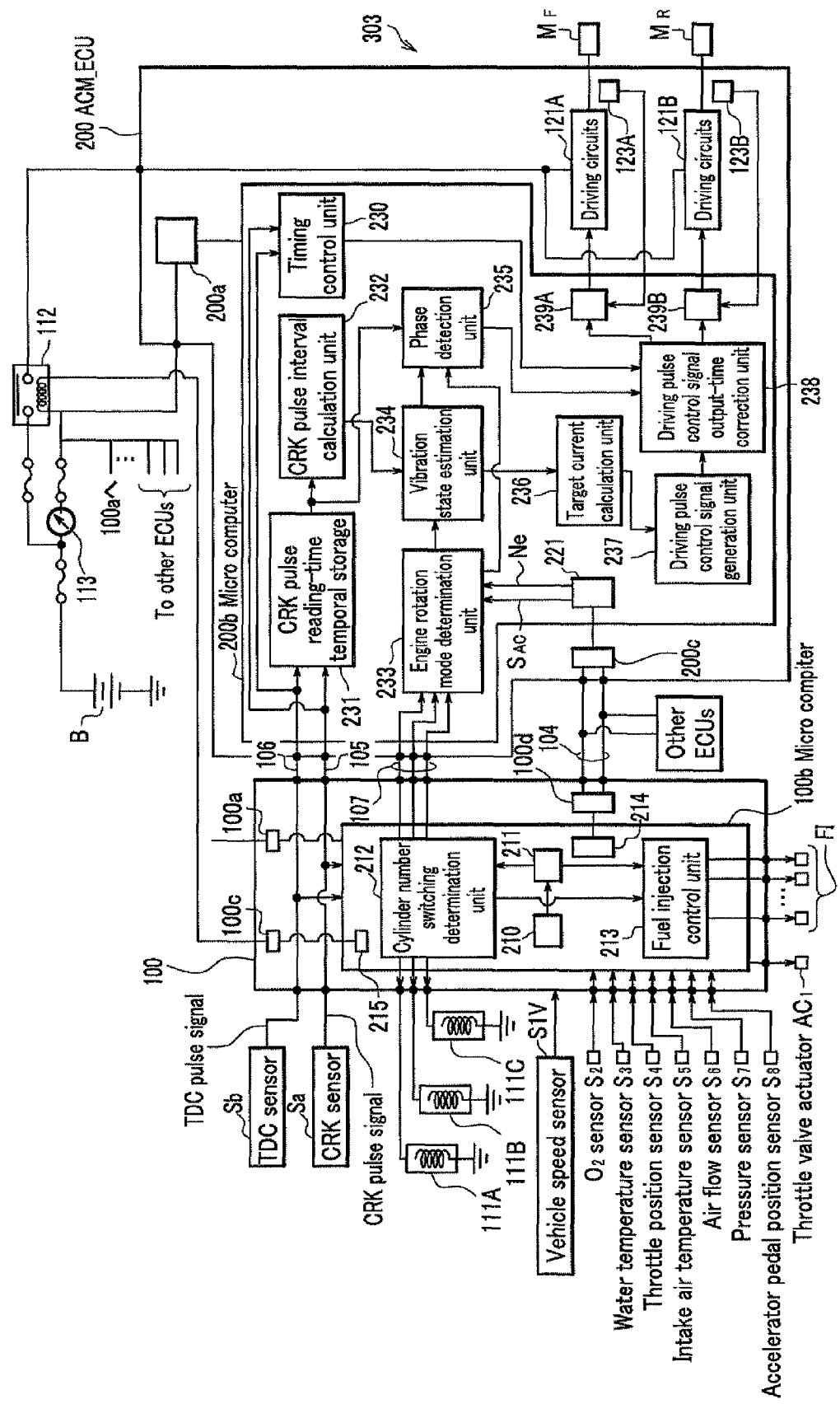
FIG. 3 is functional block diagram showing the configuration of the active anti-vibration supporting device.

The micro computer 200b then outputs the calculated target current value for PWM control, which is obtained by sampling the target current waveform, to the driving circuits 121A, 121B (refer to FIG. 3). The driving circuits 121A, 121B then controls the energization of the coils 46, 46.

In the driving unit 41 of the active control mount M which is configured as shown in FIG. 2, when current does not flow through the coil 46, a movable member 28 is upwardly moved by elastic restorative force of a second elastic body 27. Also, a nut member 56 pushes a movable core 54 up to form a gap g between the movable core 54 and the stationary core 42.

On the other hand, when current is supplied from the ACM_ECU 200A to the coil 46, magnetic flux lines generated by the coil 46 pass through the yoke 44, the movable core 54, and the gap g in an up and down direction to form a closed circuit fed back to the stationary core 42 and the coil 46, thereby moving the movable core 54 downward by sucking force. At this time, the movable core 54 moves the movable member 28 downward via the nut member 56 fixed to the rod 55 connected to the lower side of the movable member 28 so as to deform the second elastic body 27 downward. As a result, since the capacity of the second liquid chamber 31 (see FIG. 1) increases, a liquid in the first liquid chamber 30 compressed by load from the engine (see FIG. 1) flows into the second liquid chamber 31 through the through hole 29a of the partition member 29 to reduce load transmitted from the engine to the vehicle.

Conversely, when current is stopped from being supplied to the coil 46, the movable core 54 is released from the downward sucking force, the second elastic body 27 is deformed upwardly by elastic deformation of itself, and the movable core 54 is pulled up via the nut 56 fixed to the rod 55 and is moved upward. As a result, a gap g is formed. At this time, the second elastic body 27 is moved upwardly and the capacity of the second liquid chamber 31 decreases, whereby a liquid in the second liquid chamber 31 flows into the first liquid chamber 30 decompressed by towed load from the engine through the through hole 29a of the partition member 29 to reduce load transmitted from the engine to the vehicle.

As described above, the ACM_ECU 200A can control vertical motion of the movable member 28 by controlling the current supplied to the coil 46 so as not to transmit the roll vibration of the engine 102 to the vehicle body frame.

The configuration of the engine ECU 100 and the ACM_ECU200 are described in detail below.

<Configuration of Engine ECU>

The configuration of the engine ECU is described with reference to FIGS. 1, 2 and 3. FIG. 3 is a block diagram showing a configuration of the active anti-vibration supporting device.

An engine ECU 100 includes an ECU power circuit 100a, a micro computer 100b, a ROM (not shown), interface circuits for receiving signals from various sensors, a driving circuit (not shown) for driving cylinder stopping solenoids 111A, 111B and 111C, a relay switch 100c for allowing electricity to flow through the ACM power switch 112, and various interface circuits such as a CAN communication unit 100d. The engine ECU 100 are communicated with the ACM_ECU200A via a crank pulse signal line 105, a TDC pulse signal line 106 and cylinder stop signal lines 107 which are dedicated signal lines for communication between the engine ECU 100 and the ACM_ECU200. Further, the engine ECU 100 is connected to the ACM_ECU200 and other ECUs, such as an electrical power steering ECU which controls a steering torque by the assist torque of a motor through bus CAN communication lines 104.

The micro computer 100b is a functional unit which is realized by reading and executing a program stored in the ROM. The micro computer 100b includes an engine rotation speed calculation unit 210, a required output torque calculation unit 211, cylinder number switching determination unit 212, a fuel injection control unit 213 and an engine control parameter transmitting/receiving unit 214.

The engine rotation speed calculation unit 210 calculates an engine rotation speed Ne based on signals from the CRK sensor Sa and the TDC sensor Sb and outputs the calculated engine rotation speed Ne to the required output torque calculation unit 211.

The required output torque calculation unit 211 estimates a speed reducing stage of a driving reducer and a current engine output torque, calculates a required torque and an air intake quantity for generating the required torque, and controls a throttle valve actuator $A_{C1}$ mainly based on a signal from an accelerator pedal position sensor S8 which detects the pressing amount of an accelerator pedal, a signal from the vehicle speed sensor S1V which detects a vehicle speed and the engine rotation speed Ne calculated by the engine rotation speed calculation unit 210.

When the required output torque calculation unit 211 calculates the air intake amount for generating the required torque, the required output torque calculation unit 211 uses, for example, an engine coolant temperature detected by a water temperature sensor S3, a throttle opening detected by a throttle position sensor S4, an intake air temperature detected by an intake air temperature sensor S5, an inspiratory flow rate detected by the air flow sensor S6 and an inspiratory pressure detected by the pressure sensor S7, etc.

The cylinder number switching determination unit 212 determines whether or not the vehicle is in an idling state or in a cruising condition in which the output torque is small based, for example, on the engine rotation speed Ne, the vehicle speed, the estimated current torque and the required torque calculated by the required output torque calculation unit 211. When the cylinder number switching determination unit 212 determines that the vehicle is in a idling state or in a cruising condition in which the output torque is small, the cylinder number switching determination unit 212 changes the number of working cylinders based on a predetermined working cylinder number determination map (not shown) in which an engine rotation speed and a required torque, etc. are used as a parameter. Specifically, the cylinder number switching determination unit 212 controls to switch to a four cylinder operation mode or a three cylinder operation mode by applying a current to one or two of the cylinder stopping solenoids 111A, 111B, 111C to actuate a hydraulic actuator (not shown) of the valve resting mechanism.

When electricity is applied to the cylinder stopping solenoid 111A, the operation of the cylinders #1, #2, #3 are stopped. When electricity is applied to the cylinder stopping solenoid 111B, the operation of the cylinder #3 is stopped. When electricity is applied to the cylinder stopping solenoid 111C, the operation of the cylinder #4 is stopped. Therefore, electricity is applied only to the cylinder stopping solenoids 111B, 111C in the four cylinder operation mode, and electricity is applied only to the cylinder stopping solenoid 111A in the three cylinder operation mode.

When the cylinder number switching determination unit 212 switches to a selective cylinder operation mode, the cylinder number switching determination unit 212 outputs a cylinder stop signal which indicates a cylinder to be stopped from operating to an engine rotation mode determination unit 233 of the ACM_ECU200 via the cylinder stop signal line 107.

The fuel injection control unit 213 sets a fuel injection amount, or more specifically, a fuel injection time in accordance with the required torque calculated by the required output torque calculation unit 211 and the engine rotation speed Ne. The fuel injection control unit 213 also controls the fuel injection of injectors FI of the operating cylinders based on an injection start timing map (not shown) which is set in advance according to the timing of pulse signals from the CRK sensor Sa and the TDC sensor Sb and the engine rotation speed.

The fuel injection control unit 213 adjusts the fuel injection amount based on a signal indicating a concentration of oxygen in an exhaust air from the $O_2$ sensor S2 so that a combustion state is complied with the emission control.

The engine ECU 100 includes the engine control parameter transmitting/receiving unit 214 which outputs parameters such as the engine rotation speed, a vehicle speed and an estimated engine output torque obtained in the engine ECU 100 to the other ECU such as an electric power steering ECU (not shown) via the bus CAN communication line 104 or detects understeer at the time of acceleration to receive an instruction signal for suppressing the engine output torque. The engine control parameter transmitting/receiving unit 214 outputs parameters such as the engine rotation speed Ne, the vehicle speed, the estimated engine output torque to the electrical power steering ECU (not shown) through the CAN communication.

The micro computer 100b includes an ACM power relay signal output unit 215 which actuates the relay switch 100c to apply electricity to the solenoid of the ACM power switch 112 when the micro computer 100b starts to operate after the ignition switch 113 (hereinafter referred to as "IG-SW113") is turned ON and the power from the battery B is supplied to the ECU power circuit 100a.

When the IG-SW113 is turned on as shown in FIG. 3, electricity is applied to the engine ECU 100 and the ACM_ECU200A, and the ACM power relay signal output unit 215 turns on the relay switch 100c, applying electricity to the ACM power switch 112. As a result, a DC power supply is applied to the driving circuits 121A, 121B from the battery B via a booster circuit 120A, which is described later.

《 Configuration of ACM_ECU 》

Next, the ACM_ECU200 is described with reference to FIGS. 3 to 5B.

The ACM_ECU200 includes an ECU power supply 200a, a micro computer 200b, ROM (not shown), driving circuits 121A, 121B, and electric current sensors 123A, 123B.

Driving circuits 121A, 121B are each comprised of a switching element. The driving circuits 121A, 121B control the values of the current supplied to driving units 41, 41, respectively (see FIG. 1) in accordance with On and Off of the PWM control being controlled by driving control units 239A, 239B. The values of the current supplied to the driving circuits 121A, 121B are detected by the electric current sensors 123A, 123B and are input to the driving control units 239A, 239B, respectively.

As shown in FIG. 3, a micro computer 200b includes a timing control unit (a phase delay correction unit) 230, a CRK pulse reading-time temporal storage 231, a CRK pulse interval calculation unit 232, an engine rotation mode determination unit 233, a vibration state estimation unit 234, a phase detection unit (a phase delay parameter calculation unit) 235, a target current calculation unit (a target current calculation unit) 236, a driving pulse control signal generation unit 237, a driving pulse control signal output-time correction unit 238 (a phase delay correction unit) and the driving control units 239A, 239B that are functional parts realized by reading and executing a program stored in a ROM.

A crank pulse signal (shown as "a CRK pulse signal" in FIG. 3) input from the engine ECU 100 via a crank pulse signal line 105 is input to the CRK pulse reading-time temporal storage 231 and the timing control unit 230. A TDC pulse signal input from the engine ECU 100 via a TDC pulse signal line 106 is also input to the CRK pulse reading-time temporal storage 231 and the timing control unit 230.

(Explanation on Calculation Cycle)

Firstly, calculation processing cycles executed in the micro computer 200b of the ACM_ECU 200 for controlling the active control mount M (referred to as "ACM control" hereinafter) in synchronization with the TDC pulse signal and the crank pulse signal is described with reference to FIGS. 4A to 4D.

FIGS. 4A to 4D are illustrations for explaining the calculation cycles of the ACM control by a micro computer of the ACM_ECU in synchronization with the TDC pulse signal and the crank pulse signals. FIG. 4A represents a time chart of the calculation cycle. FIG. 4B is a timing chart for explaining a method for dividing each calculation cycle into four stages STG on the basis of the crank pulse signals. FIG. 4C is a timing chart for explaining calculations performed based on the crank pulses obtained at the calculation cycle CUCYL whose cycle No. is "0" in the sequential two calculation cycles which follow the calculation cycle CUCYL whose cycle No. is "0". FIG. 4D is a timing chart for explaining a feed back control to the current corresponding to an output target current waveform.

Here, the CRK sensor Sa is a sensor for detecting a crank pulse generated by a crank shaft (not shown) of an engine. In an embodiment, the crank pulse is basically generated every 6 degrees of the crank angle change in the case of 6 cylinder engine. The CRK sensor Sa detects this crank pulse and inputs it to the engine ECU 100. The TDC sensor Sb is a sensor which outputs a TDC pulse signal once every top dead center of each cylinder and inputs the TDC pulse signal to the engine ECU 100 three times per one rotation of the crank shaft. Every time the TDC pulse signal of each cylinder is input, the calculation cycle CUCYL (see FIG. 4A) of the ACM control is updated to the next calculation cycle CUCYL.

FIG. 4A shows calculation cycles CUCYL indicated as "CUCYL" which are later-described "CRK pulse interval reading cycles" in which the results of repeatedly measuring the clock pulses of the micro computer 200b for each of a predetermined number of crank pulses (e.g. 20) generated in the range of 120 degrees of the crank angle from a time when the TDC pulse signal is received is stored. The calculation cycle numbers 0 to 5 are assigned to a series of consecutive "CRK pulse interval reading cycles" to identify each of the "CRK pulse interval reading cycles" to identify each of the "CRK pulse interval reading cycles". Storing the measuring results of the clock pulses for each of the crank pulse signals in the range of 120 degrees of the crank angle as described above is referred to as "a CRK pulse interval reading process", hereinafter.

FIG. 4B showing "STG" describes that the timing control unit 230 generates a stage trigger signal in every crank pulse signal generated at 30 degrees of the crank angle change from a time when the TDC pulse signal is received in order to divide a calculation cycle CUCYL into four stages STG whose stage numbers are 0 to 3. It is to be noted that the stage trigger signal includes information indicating the stage number. The time period corresponding to each of the stages STG is referred to as "a STG time". The STG time is varied depending on the engine rotation speed.

Time cycle of the engine vibration corresponds to 120 degrees of the crank angle change when all cylinders of the V-type 6 cylinder engine are operated. The following description is made assuming that all cylinders of the V-type 6 cylinder engine are operated. The stage STG is set in such a manner that a time required for the crank shaft to rotate by the crank angle of the first stage whose stage number is "0" is a little shorter than the phase delay δ1 (refer to FIG. 4D) of the output time of a later-described target current waveform generated for suppressing the engine vibration from the time when the TDC pulse signal is received. The stage STG is experimentally set in advance in correspondence to the case where the cycle of the engine vibration corresponds to the crank angle change of 120 degrees. Thus, without limited to the configuration in which one calculation cycle CUCYL is divided into four sections, a crank angle corresponding to each stage may be set in an angle which is the multiple number of 6 and can divide 120 (e.g. 24 degrees (one cycle is divided in 5 sections) or 12 degrees (one cycle is divided in 10 sections)) so as to divide one calculation cycle CUCYL into stages of an integral number N which is more than 4.

FIG. 4C describes the calculation processes performed based on the crank pulse signal obtained in the calculation cycle CUCYL whose calculation cycle number is 0 in FIG. 4A in the sequential two calculation cycles which follow the calculation cycle CUCYL whose calculation cycle number is 0. The calculation cycle CUCYL whose calculation cycle number is "1" is shown to be a calculation processing cycle (shown as "ENG vibration estimating calculation & target current calculation cycle" in FIG. 4C) in which calculation for estimating the engine vibration (described later) or calculating a target current waveform for the ACM control is performed based on the crank pulse signal obtained in the calculation cycle CUCYL whose calculation cycle number is "0". The following calculation cycle CUCYL whose calculation cycle number is "2" is shown to be a calculation processing cycle (shown as "a target current output cycle" in FIG. 4C) in which the output control of the target current waveform is performed based on the crank pulse signal obtained in the calculation cycle CUCYL whose calculation cycle number is "0".

The "target current output cycle" corresponds to "timing for driving an actuator" recited in Claims.

Hereinafter, the process executed in the "ENG vibration estimating calculation & target current calculation cycle" is referred to as "ENG vibration estimating calculation & target current calculation process" and the process executed in the "target current output cycle" is referred to as "a target current output process".

FIG. 4D shows in its upper part a target current waveform (shown as "a front side target current waveform" in FIG. 4D) for drive controlling the front side active control mount $M_F$ and a phase delay δ1 from the reception time of the TDC pulse signal when the target current waveform is output in the target current output cycle. FIG. 4D shows in its lower part a target current waveform (shown as "the rear side target current waveform" in FIG. 4D) for drive controlling the rear side active control mount $M_R$ and a phase delay δ2 based on the TDC pulse signal when the target current waveform is output in the target current output cycle.

It is to be noted that in the target current output cycle, a feedback control of the current corresponding to the output target current waveform performed by the driving control units 239A, 239B (see FIG. 3) is referred to as "Current F/B" in FIG. 4D. Note that the actual target current output cycle is elongated by the phase delays δ1, δ2 since there are the phase delays δ1, δ2 from the TDC pulse signal reception time in the driving control units 239A and 239B. FIG. 4D schematically describes the processing cycles in the length of the "CRK pulse interval reading cycles". The "ENG vibration estimating calculation & target current calculation cycle" is also controlled to perform a calculation process in the period of one calculation cycle CUCYL, however, only the "target current output cycle" is controlled to exceed the period of one calculation cycle CUCYL, taking the phase delays δ1, δ2 into consideration.

Such a control of the calculation cycles CUCYL and division into the stages STG is executed by the timing control unit 230, which is described later in detail.

(The Timing Control Unit)

Next, returning to FIG. 3, functions of each functional block described above are explained with reference to FIGS. 1, 3, 4 and 7 as appropriate.

As shown in FIG. 3 the timing control unit 230 reads the crank pulse signal and the TDC pulse signal, calculates the crank pulse count, updates the calculation cycle CUCYL and generates the stage trigger signal to divide a cycle into the stages STG based on the TDC pulse signal and the crank pulse signal.

The timing control unit 230 makes the CRK pulse reading-time temporal storage 231 to read the results of measuring the clock pulses for 20 consecutive crank pulse signals from the time when the TDC pulse signal is received and to temporarily store the results (i.e. to perform the process of the "CRK pulse interval reading cycle"). Continuing from the "CRK pulse interval reading cycle", the timing control unit 230 makes the CRK pulse interval calculation unit 232, the engine rotation mode determination unit 233, the vibration state estimation unit 234, the phase detection unit 235, the target current calculation unit 236 and the driving pulse control signal generation unit 237 to perform a series of detailed calculation (i.e. the "ENG vibration estimating calculation & target current calculation process" based on the temporarily stored crank pulse signals and measuring results of the clock pulses for each of the temporarily stored crank pulse signals from the time when the TDC pulse signal is received.

Further, the timing control unit 230 makes the driving pulse control signal output-time correction unit 238 and the driving control units 239A, 239B to perform the output control of the target current waveform (i.e. the "target current output process"). At this time, the timing control unit 230 forwards the TDC pulse signal and the crank pulse signal received from the engine ECU 100 to the driving pulse control signal output-time correction unit 238 and also outputs the stage trigger signal including information having the stage number, wherein the stage trigger signal is generated every predetermined numbers of the crank pulse signals measured from the time when the TDC pulse signal is received (e.g. every crank angle change of 30 degrees).

Thus, the timing control unit 230 makes each of other functional parts to sequentially perform pipeline processing. More specifically, during one calculation cycle CUCYL, when (1) the "CRK pulse interval reading process" is performed in the CRK pulse reading-time temporal storage 231, (2) the "ENG vibration estimating calculation & target current calculation process" is executed in the CRK pulse interval calculation unit 232, the engine rotation mode determination unit 233, the vibration state estimation unit 234, the phase detection unit 235, the target current calculation unit 236, the driving pulse control signal generation unit 237 and (3) the "target current output process" is executed in the driving pulse control signal output-time correction unit 238 and the driving control units 239A, 239B. It is to be noted that the "target current output process" is continued to be performed until the "target current output process" is completed, exceeding the period of the one calculation cycle CUCYL by the phase delays δ1, δ2.

This series of the processings corresponds to "cycles" in Claims.

<CRK Pulse Reading-Time Temporal Storage>

The CRK pulse reading-time temporal storage 231 is controlled by the timing control unit 230 to read and temporarily store the results of measuring the clock pulses of the micro computer 200b from the time when the TDC pulse signal is received for each of the 20 crank pulse signals every "CRK pulse interval reading cycle" described above.

<CRK Pulse Interval Calculation Unit>

The CRK pulse interval calculation unit 232 is controlled by the timing control unit 230 to read each of the measurement results of the clock pulses for the crank pulse signals temporarily stored in the CRK pulse reading-time temporal storage 231, to calculate the crank pulse time intervals and to output the crank pulse time intervals to the vibration state estimation unit 234.

As the clock pulses are generated in the micro computer 200b in a constant cycle, it is easy to calculate the crank pulse time interval from the measurement results of the clock pulses.

<Vibration State Estimation Unit>

The vibration state estimation unit 234 is controlled by the timing control unit 230 to calculate 19 crank angle speeds from a series of time series crank pulse time intervals calculated by the CRK pulse interval calculation unit 232 and corresponding to the crank angle change of 6 degrees and then to calculate a series of time series crank angle accelerations based on the crank angle speeds.

Next, the vibration state estimation unit 234 calculates a series of time series torques of the crank shaft of the engine based on the series of the time series crank angle accelerations. The torque Tq of the crank shaft of the engine is calculated by the following equation (1)

$$Tq = I_E \times (d\omega/dt) \quad (1)$$

where the crank angle acceleration is represented by $d\omega/dt$ and the inertial moment of the crank shaft of the engine is represented by $I_E$.

If it is assumed that the crank shaft is rotated in a constant rotation speed ω, the torque Tq becomes 0. However, in the expansion process of an engine cylinder the rotation angle speed ω is increased by the acceleration of the piston and the rotation speed ω is decreased in the compression process by the deceleration of the piston to generate the crank angle acceleration $d\omega/dt$. Therefore, the torque Tq in proportion to the crank angle acceleration $d\omega/dt$ is generated.

After calculating the torque Tq, the vibration state estimation unit 234 determines the maximum value and the minimum value of the temporally-continuous torques of a series of the time series torques. The vibration state estimation unit 234 then calculates the amplitude of the vibration at the position of the active control mount M supporting the engine as the difference between the maximum value and the minimum value of the torques Tq (i.e. the variation amount of the torque Tq).

At this time, if there is a plurality of vibration modes in engine vibration mode information input from the engine rotation mode determination unit 233, the vibration state estimation unit 234 calculates the amplitude of the vibrations of the cycles which correspond to the vibration modes.

The engine vibration mode information indicates what order the vibration mode is which is related to the engine rotation speed Ne. Further, the average crank pulse interval can be calculated from the engine rotation speed Ne at that time. By determining the maximum value and the minimum value of the torques Tq in the cycle of the crank pulses corresponding to the engine vibration mode from the series of the time series torques Tq, the vibration state estimation unit 234 can obtain the variation amount of the torque Tq in the vibration mode whose cycle is shorter than that of the crank angle change of 120 degrees, and thus, the vibration state estimation unit 234 can calculate the amplitude of the vibration at the position of the active control mount M supporting the engine.

The vibration state estimation unit 234 outputs the calculated amplitudes of each of the engine vibration modes (the amplitude between the peak value of the torque Tq on the maximum value side and the peak value of the torque Tq on the minimum value side (hereinafter, referred to as the "P-P value of the torque Tq"), the peak timing of the torque Tq to the phase detection unit 235 and the target current calculation unit 236, and outputs the series of the time series torques Tq to the phase detection unit 235.

The vibration state estimation unit 234 calculates the cycle of the engine vibration from the crank pulse intervals calculated by the CRK pulse interval calculation unit 232. The cycle of the engine vibration indicates the time interval between every TDC pulse signals and indicates the time interval of every crank angle change of 120 degrees. Since the crank pulse interval indicates the time interval of every crank angle change of 6 degrees, one cycle of the engine vibration is obtained by calculating the total time of the 20 crank pulse intervals.

<Engine Rotation Mode Determination Unit>

The engine rotation mode determination unit 233 is controlled by the timing control unit 230 to determine whether the engine is in an all cylinder operation state, a 2 cylinder resting operation state or a 3 cylinder resting operation state while the CRK pulse reading-time temporal storage 231 temporarily stores the crank pulse signals, etc. The engine rotation mode determination unit 233 also determines whether or not the engine is in an idling state and outputs the engine vibration mode information corresponding to the determination result to the vibration state estimation unit 234 and the phase detection unit 235. The processes of determining whether or not the engine is in the all cylinder operation state, the 2 cylinder resting operation state or in the 3 cylinder resting operation state and determining whether or not the engine is in the idling state can be performed based on a resting cylinder signal received from the cylinder number switching determination unit 212 of the engine ECU 100, the engine rotation speed signal, and the accelerator position sensor signal, etc.

The engine vibration mode information is information indicating which mode is the maximum component with the high mode component such as the second order being taken into consideration when the vibration having the minimum cycle which is synchronized with the engine rotation speed is regarded as a basic mode. The information also indicates which vibration mode is to be considered for suppressing the transmission of the engine vibration.

The engine vibration mode information is stored in the form of a map in the ROM with the operation state of the engine such as the all cylinder operation state, the 2 cylinder resting operation state and the 3 cylinder resting operation state and the engine rotation speed being its parameters.

In the case of the V-type 6 cylinder engine, the vibration of the basic mode in accordance with the engine rotation speed is referred to as "the third order engine vibration" since explosions take place in three cylinders every one rotation of the crank shaft and the vibration frequency of the third order engine vibration is increased as the engine rotation speed is increased.

In the case of an in-line four cylinder engine, the vibration of the basic mode in accordance with the engine rotation speed is referred to as the "second order engine vibration" since explosions take place in two cylinders every one rotation of the crank shaft. In the case where the engine is in a three cylinder operation state in the V-six cylinder engine (i.e. in a selective cylinder operation), explosions take place 1.5 times per one rotation of the crank shaft, and thus the vibration of the basic mode in accordance with the engine rotation speed is referred to as "the 1.5 order engine vibration".

The explanation of the effect of the embodiment is described taking as an example the case of the all cylinder operation state, and thus the detailed description of the ACM control for the engine vibration in the case of the selective cylinder operation state is omitted.

<Phase Detection Unit>

Based on the Peak to Peak value of the torque Tq, the peak timing of the torque Tq and a series of the time series torque Tq output from the vibration state estimation unit 234, the crank pulse signals read from the CRK pulse reading-time temporal storage 231 and measurement results of the clock pulses measured from the reception time of the TDC pulse signal of each cylinder for the crank pulse signals, the phase detection unit 235 compares the peak timing of the torque Tq with the timing of the TDC, and calculates the phase delay (temporarily-set phase delay) $P1_F$ (see FIGS. 7A to 7C) on the time base for the ACM control of the front side active control mount $M_F$. Hereinafter, the phase delay $P1_F$ is referred to as a "front side phase delay". Further, the phase detection unit 235 divides the calculated phase delay $P1_F$ by the average STG time (=(T1)/4) (see FIGS. 7A to 7C) of the stages STG in one cycle of the engine vibration calculated by the vibration state estimation unit 234 to calculate its quotient $S1_F$ (see FIGS. 7A to 7C) and the remainder time $P'1_F$ (see FIGS. 7A to 7C). The calculated quotient $S1_F$ corresponds to the number of stages STG (hereinafter, referred to as a "STG number").

Here, T1 is the cycle length of the engine vibration in the "CRK pulse interval reading cycle" and represents the cycle length of the first cycle (the first vibration cycle) C1 (see FIGS. 7A to 7C) of the engine vibration, which is described later. The average STG time ((T1)/4) corresponds to "a first predetermined time determined by a rotation speed of an engine" recited in Claims. More specifically, the average STG time ((T1)/4) is an average time required for the crank shaft to be rotated by the crank angle of 30 degrees in the "CRK pulse interval reading cycle".

Further, the phase detection unit 235 adds to the calculated phase delay $P1_F$ the half of the cycle length T1 δ0 (see FIG. 5B) which is the phase difference between the front and rear active control mounts $M_F$, $M_R$ to calculate the phase delay $P1_R$ (hereinafter, referred to as a "rear side phase delay") of the active control mount $M_R$. Here, the rear side phase delay $P1_R$ also corresponds to a "temporarily-set phase delay" recited in Claims. Similarly to the front side phase delay $P1_F$, the phase detection unit 235 divides the rear side phase delay $P1_R$ by the average STG time ((T1)/4) of the stages STG in one cycle of the engine vibration calculated by the vibration state estimation unit 234 to calculate its quotient $S1_R$ and its remainder $P'1_R$ (time).

The phase detection unit 235 inputs calculated two pairs of data for the front side and rear side phase delays (i.e. the STG number $S1_F$ and the remainder $P'1_F$ (time)) and (the STG number $S1_R$ and the remainder $P'1_R$ (time)) to the driving pulse control signal output-time correction unit 238.

<Target Current Calculation Unit>

The target current calculation unit 236 calculates target current waveforms for the front and rear active control mounts $M_F$, $M_R$ based on the amplitude of the vibration at the position of the active control mount M in the engine vibration mode specified by the engine rotation mode determination unit 233, wherein the amplitude of the vibration is input from the vibration state estimation unit 234.

More specifically, a plurality of target current waveform patterns, each of which corresponds to vibration mode information output by the engine rotation mode determination unit 233, is stored in the ROM in advance, and specific target current waveform patterns are selected with reference to the vibration mode information. Based on the selected target current waveform patterns, the gains of the current value waveforms corresponding to the amplitudes of respective vibration modes are set and synthesized to set one current value waveform. The length of the current value waveform is set in a time length of the cycle length T1 of the engine vibration calculated by the vibration state estimation unit 234.

FIGS. 5A and 5B illustrate target current waveforms for the active control mounts $M_F$, $M_R$ at the timing for driving the actuator. FIG. 5A is a graph showing the target current waveform $I_{TF_r}$ for the active control mount $M_F$. FIG. 5B is a graph for showing the target current waveform $I_{TR_r}$ for the active control mount $M_R$. Here, the vertical axis in FIG. 5A indicates a target current value Fr_ICMD for the ACM control of the active control mount $M_F$ and the lateral axis in FIG. 5A indicates time. Similarly, the vertical axis in FIG. 5B indicates a target current value Rr_ICMD for the ACM control of the active control mount $M_R$, and the lateral axis in FIG. 5B indicates time.

It is to be noted that the phase delays δ1, δ2 in FIGS. 5A and 5B are phase delays which are set by the driving pulse control signal output-time correction unit 238 when the active control mounts $M_F$, $M_R$ are actually controlled.

Note that the target current waveform $I_{TFr}$ for the active control mount $M_F$ and the target current waveform $I_{TRr}$ for the active control mount $M_R$ generated in the target current calculation unit 236 are generally different target current waveforms. In the target current calculation unit 236, only the target current waveforms $I_{TFr}$, $I_{TRr}$ for the active control mounts $M_F$, $M_R$ are set.

Further, the target current waveforms $I_{TFr}$, $I_{TRr}$ shown in two dot chain lines in FIGS. 5A and 5B indicate the target current waveforms $I_{TFr}$, $I_{TRr}$ set by the target current calculation unit 236 in the next processing cycle.

<Driving Pulse Control Signal Generation Unit>

The driving pulse control signal generation unit 237 is described with reference to FIGS. 3 to 5B. The driving pulse control signal generation unit 237 samples the target current waveforms $I_{TFr}$, $I_{TRr}$ set in the target current calculation unit 236 at the constant cycle length $T_{PWN}$ in which the target current is actually PWM-controlled (e.g. the cycle interval of 500 µsec.) in the driving control unit 239A and the driving circuit 121A and the driving control unit 239B and the driving circuit 121B on the side of the ACM_ECU 200 to set the data aggregate of the target current value Fr_ICMD for the PWM control of the active control mount $M_F$ and the data aggregate of the target current value Rr_ICMD for the PWM control of the active control mount $M_R$.

Here, the data aggregate of the target current value Fr_ICMD for the PWM control of the active control mount $M_F$ and the data aggregate of the target current value Rr_ICMD for the PWM control of the active control mount $M_R$ which are sampled at the constant cycle length $T_{PWN}$ corresponds to "current corresponding to the target current waveform" recited in claims.

A series of the target current value which is sampled at the cycle length $T_{PWN}$ and indicated by white dots from the target current waveforms $I_{TFr}$, $I_{TRr}$ as shown in FIGS. 5A and 5B is data aggregate of the target current value Fr_ICMD for a cycle of the PWM control.

A series of the target current value which is output by the phase delay δ0, which is the half of the engine vibration cycle, from the start point of the target current value Fr_ICMD is data aggregate of the target current value Rr_ICMD.

Therefore, as the engine rotation speed gets higher, the time width of the target current waveforms $I_{TFr}$, $I_{TRr}$ get shorter. Since the short target current waveforms $I_{TFr}$, $I_{TRr}$ are sampled at the constant cycle length $T_{PWN}$ to set the data aggregates of the target current values Fr_ICMD, Rr_ICMD, the number of data representing each of the target current values Fr_ICMD, Rr_ICMD that constitute the data aggregates of the target current values is decreased.

The driving pulse control signal generation unit 237 outputs the data aggregates of the target current value Fr_ICMD and the target current value Rr_ICMD to the driving pulse control signal output-time correction unit 238.

<Driving Pulse Control Signal Output-Time Correction Unit>

Returning to FIG. 3, the driving pulse control signal output-time correction unit 238 is described.

Two pairs of data for the front side and rear side phase delays (the STG number $S1_F$ and remainder P'$1_F$ (time)) and (the STG number $S1_R$ and remainder P'$1_R$ (time)) calculated by the phase detection unit 235 in the "ENG vibration estimating calculation & target current calculation cycle" are input to the driving pulse control signal output-time correction unit 238. The data aggregate of the target current value Fr_ICMD and the data aggregate of the target current value Rr_ICMD are also input to the driving pulse control signal output-time correction unit 238 from the driving pulse control signal generation unit 237 in the "ENG vibration estimating calculation & target current calculation cycle".

The driving pulse control signal output-time correction unit 238 is controlled by the timing control unit 230 to calculate the crank pulse interval of the stages of the STG number $S1_F$ based on the TDC pulse signal and the crank pulse signal input from the timing control unit 230 in the "target current output cycle". The driving pulse control signal output-time correction unit 238 outputs to the driving control unit 239A the data aggregate of the target current value Fr_ICMD for the active control mount $M_F$ after the remainder time P'$1_F$ is passed from a "phase delay reference", wherein the time in which the crank shaft has been rotated in the crank angle of the stages STG of the STG number $S1_F$ is referred to as the "phase delay reference" of the front side phase delay.

Further, the driving pulse control signal output-time correction unit 238 is controlled by the timing control unit 230 to calculate the crank pulse interval of the STG number $S1_R$ based on the TDC pulse signal and the crank pulse signal input from the timing control unit 230 in the "target current output cycle". The driving pulse control signal output-time correction unit 238 outputs to the driving control unit 239B the data aggregate of the target current value Rr_ICMD for the active control mount $M_R$ after the remainder time P'$1_R$ has passed from the "phase delay reference", wherein the time in which the crank shaft is rotated in the crank angle of the stages STG of the STG number $S1_R$ is referred to as the "phase delay reference" of the rear side phase delay.

In short, the data aggregate of the target current value Fr_ICMD is output at the phase delay δ1, and the data aggregate of the target current value Fr_ICMD is output at the phase delay δ2 from the timing when the TDC pulse signal is received in the "target current output cycle" shown in FIGS. 4A to 4D.

When detecting the crank angle changes of the stages STG of the STG number $S1_F$ and the STG number $S1_R$, the crank angle change during the stages STG of the STG number $S1_F$ (i.e. the STG time passed during the stages STG of the STG number $S1_F$) and the crank angle change during the stages STG of the STG number $S1_R$ (i.e. the STG time passed during the stages STG of the STG number $S1_R$) may be detected by using the stage trigger signal input from the timing control unit 230 instead of using the TDC pulse signal and the crank pulse signals.

The aforementioned crank angle changes during the stages STG of the STG number $S1_F$ and the STG number $S1_R$ in the "target current output cycle" corresponds to "a second predetermined time determined according to the quotient and determined by the engine rotation speed" recited in Claims.

<Driving Control Unit>

The driving control unit 239A generates a PWM duty command corresponding to the data aggregate of the target current value Fr_ICMD output from the driving pulse control signal output-time correction unit 238 at the phase delay δ1 and outputs the PWM duty command to the driving circuit 121A. The driving circuit 121A electrically controls in accordance with the PWM duty command and feeds the electricity to the driving unit 41 of the active control mount $M_F$ (see FIG. 1). The electric current sensor 123A measures the value of the current which is fed by the driving circuit 121A and inputs it to the driving control unit 239A.

The driving control unit 239A calculates the difference between the target current value Fr_ICMD and the measured current value, and corrects the PWM duty command for the new target current value Fr_ICMD of the cycle length $T_{PWN}$ of the next PWM control, and outputs it to the driving circuit 121A.

As described above, the driving control unit 239A feedbacks and outputs the PWM duty command for the target current value Fr_ICMD to feed the electricity to the driving unit 41 of the active control mount $M_F$.

Similarly to the driving control unit 239A, the driving control unit 239B generates a PWM duty command corresponding to the data aggregate of the target current value Rr_ICMD output from the driving pulse control signal output-time correction unit 238 at the phase delay δ2 and outputs the PWM duty command to the driving circuit 121B. The driving circuit 121B performs an electrical control in accordance with the PWM duty command and feeds the electricity to the driving unit 41 of the active control mount $M_R$ (see FIG. 1). The electric current sensor 123B measures the current value which has been fed by the driving circuit 121B and inputs it to the driving control unit 239B.

The driving control unit 239B calculates the difference between the target current value Rr_ICMD and the measured current value, and corrects the PWM duty command for the new target current value Rr_ICMD of the cycle length $T_{PWN}$ of the next PWM control, and outputs it to the driving circuit 121B.

As described above, the driving control unit 239B feedbacks and outputs the PWM duty command for the target current value Rr_ICMD to feed the electricity to the driving unit 41 of the active control mount $M_R$.

《 Method for Controlling Active Anti-Vibration Supporting Device》

Figure 6:
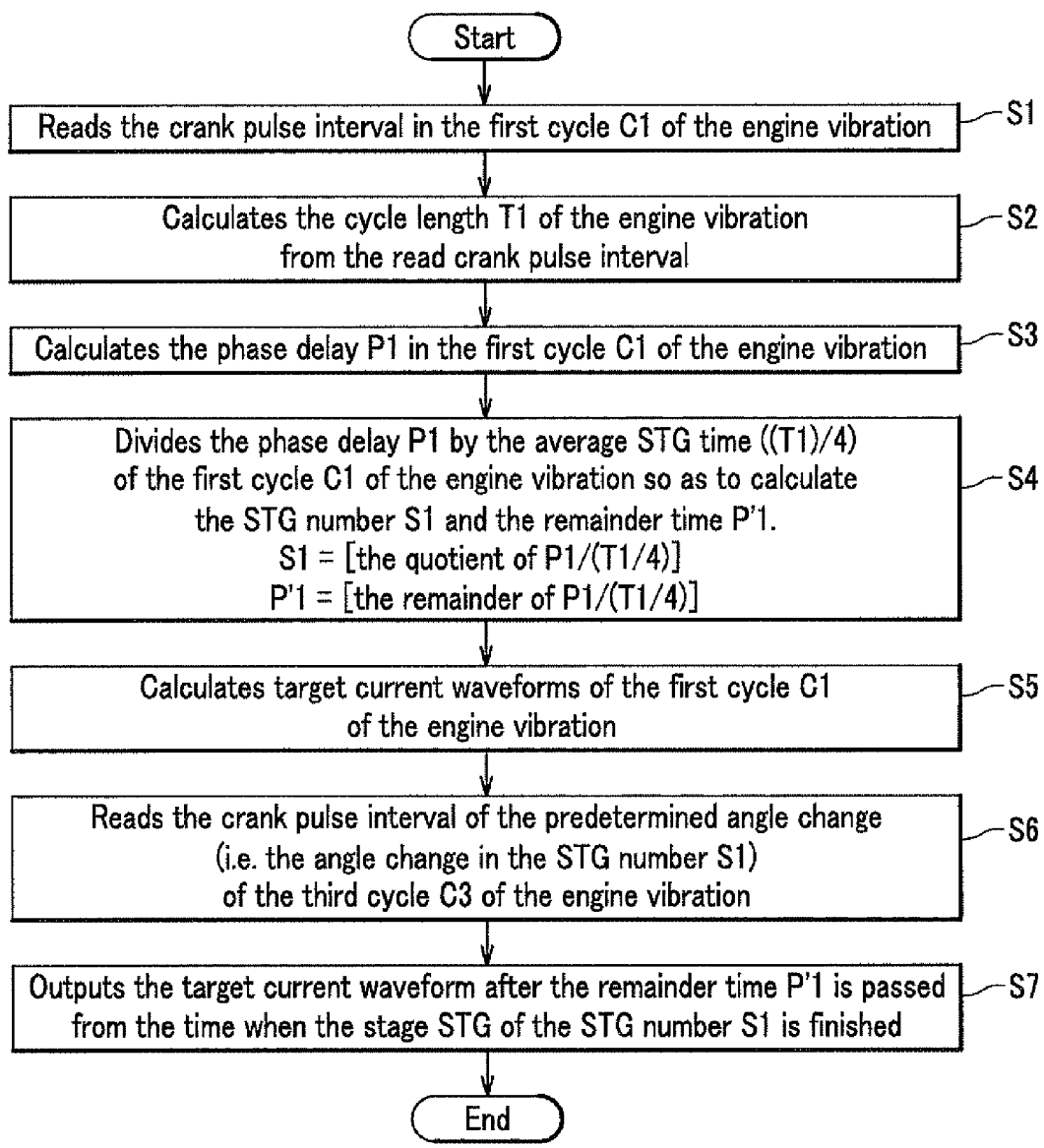
FIG. 6 is a flow chart showing the processing for controlling to isolate vibration.
Figure 7:
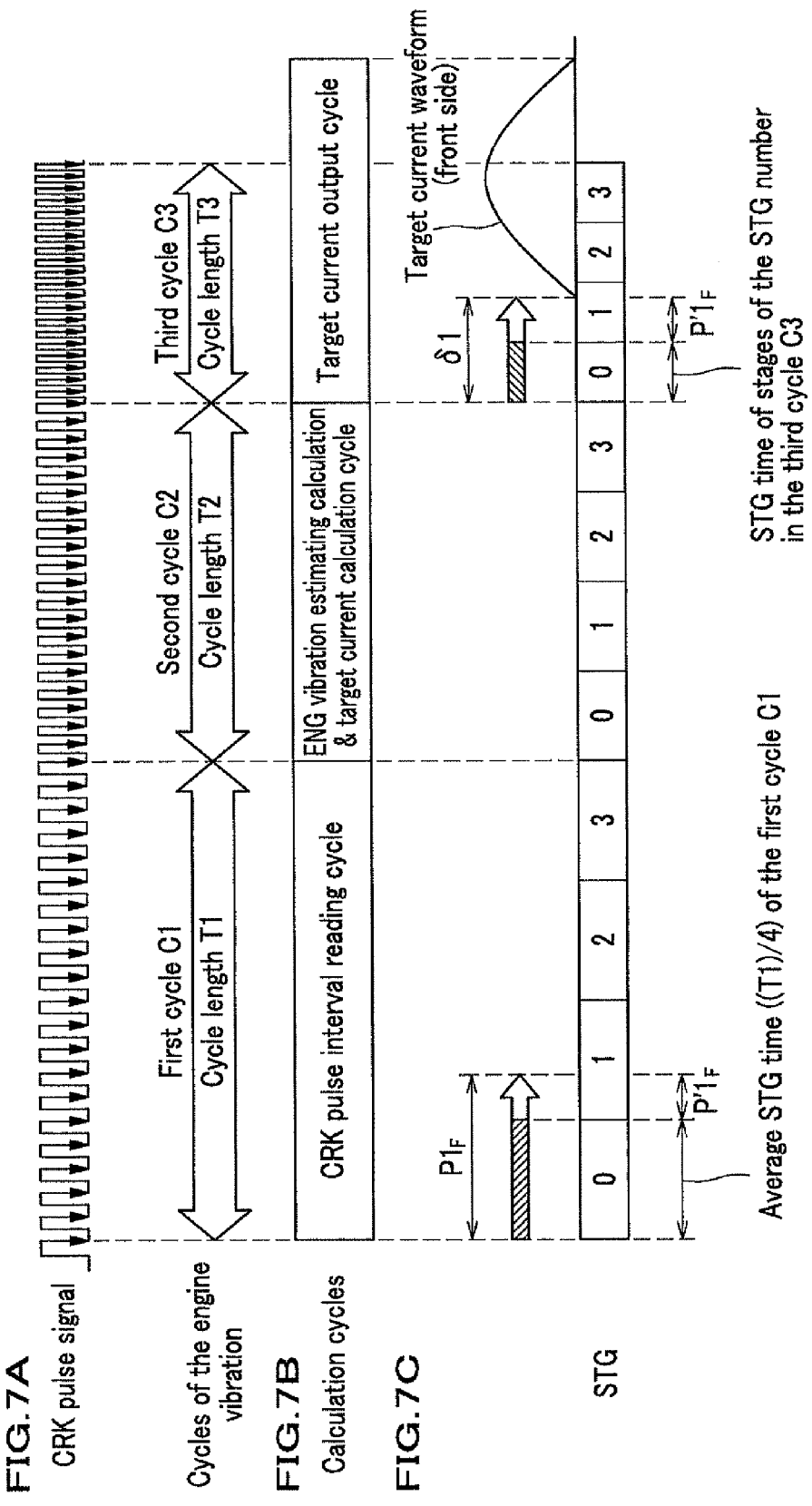
FIGS. 7A to 7C are illustrations for explaining the step of adjusting the phase delay $P1_F$ calculated based on the crank pulse signal obtained in the crank pulse interval reading cycle in which the engine rotation speed is increased.
Figure 8:
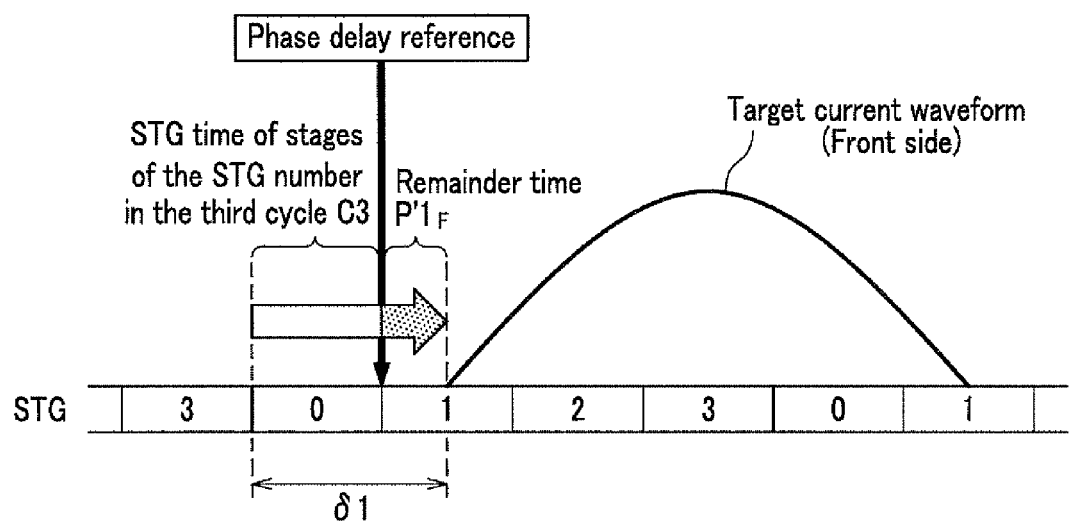
FIG. 8 is an illustration for explaining in detail the output control of the front side target current waveform in the target current output cycle.

A method performed by the active anti-vibration supporting device 301 for controlling vibration is described with reference to FIGS. 3, 6, 7 and 8 as appropriate. FIG. 6 is a flowchart for showing the processing flow of the vibration control. FIGS. 7A to 7C are illustrations describing the phase delay $P1_F$ which is calculated based on crank pulse signals obtained in the crank pulse interval reading cycle when the engine rotation speed is increasing and a process for adjusting the phase delay in the target current output cycle. FIG. 7A illustrates the correspondence relationship of the time chart of the crank pulse signals and the cycles of the engine vibration; FIG. 7B is a time chart for "calculation processing cycles"; and FIG. 7C illustrates a process for adjusting the phase delay when the front side target current waveform is output. FIG. 8 is an illustration for describing the output control of the target current waveform in the target current output cycle.

FIG. 7A shows that as the engine rotation speed is increased, the cycles of the crank pulse signals and the cycles of the engine vibration are gradually shortened. FIG. 7A shows in its lower side that the vibration state estimation unit 234 calculates cycles of the engine vibration, or more specifically, the cycle length T1 of the first cycle (the first vibration cycle) C1; the cycle length T2 of the second cycle (the second vibration cycle) C2; and the cycle length T3 of the third cycle (the third vibration cycle) C3 based on the 20 crank pulse signals starting from the point when the TDC pulse signal (not shown) is received.

The interval of each crank pulse signal in the engine vibration cycle C2 is shorter than that of each crank pulse signal in the cycle C1 of the engine vibration, and the interval of each crank pulse signal in the cycle of the cycle length T3 of the engine vibration is shorter than the interval of each crank pulse signal in the cycle of the cycle length T2 of the engine vibration. Accordingly, the cycle length T2 of the second cycle C2 of the engine vibration is shorter than the cycle length T1 of the engine vibration cycle C1, and the cycle length T3 of the third cycle C3 of the engine vibration is shorter than the cycle length T2.

FIG. 7B shows calculation process cycles. FIG. 7B describes that the ENG vibration estimating calculation & target current calculation process is performed in the second cycle C2 of the engine vibration, and the target current output process is performed in the third cycle C3 of the engine vibration based on the measuring results of the clock pulses corresponding to the crank pulse signals which are obtained by the CRK pulse interval reading process in the first cycle C1 of the engine vibration.

In step S1 shown in FIG. 6, the CRK pulse reading-time temporal storage 231 is controlled by the timing control unit 230 to read the crank pulse interval in the first cycle C1 of the engine vibration as shown in FIGS. 7A and 7B. More specifically, the CRK pulse reading-time temporal storage 231 reads results of measuring the clock pulses of the micro computer 200b from the time when the TDC pulse signal is received to each of the successive 20 crank pulse signals starting from the time when the TDC pulse signal is received in the first cycle C1 of the engine vibration and temporarily stores the measuring results (i.e. performs the "CRK interval reading cycle").

In step S2, as shown in FIGS. 7A and 7B, the vibration state estimation unit 234 is controlled by the timing control unit 230 to calculate the cycle length T1 of the engine vibration from the crank pulse interval read in step S1 in the "ENG vibration estimation calculation & target current calculation cycle" which corresponds to the second cycle C2 of the engine vibration. The vibration state estimation unit 234 also calculates the amplitude of the engine vibration as described above.

More specifically, the vibration state estimation unit 234 reads the measuring results of the clock pulses for each of the 20 crank pulse signals stored in the CRK pulse reading-time temporal storage 231 in the "CRK interval reading cycle" and calculates the 20 crank pulse time intervals and the cycle length T1 of the first cycle C1 of the engine vibration represented in time in the "ENG vibration estimating calculation & target current calculation cycle" which corresponds to the second cycle C2 of the engine vibration shown in FIGS. 7A and 7B.

In step S3, the phase detection unit 235 is controlled by the timing control unit 230 to calculate the phase delay P1 in the first cycle C1 of the engine vibration. This calculation is also executed in the "ENG vibration estimating calculation & target current calculation cycle" which corresponds to the second cycle C2 of the engine vibration shown in FIGS. 7A and 7B.

Here, the phase delay P1 includes both of the phase delay $P1_F$ and the phase delay $P1_R$ calculated in the phase detection unit 235 and are collectively referred to as the "phase delay P1".

In step S4, the phase detection unit 235 is controlled by the timing control unit 230 to divide the phase delay P1 by the average STG time (T1/4) of the first cycle C1 of the engine vibration so as to calculate the STG number S1 and the remainder time P'1. In short, the phase detection unit 235 calculates S1=[the quotient of P1/(T1/4)] and P'1=[the remainder of P1/(T1/4)]. This calculation is also executed in the "ENG vibration estimating calculation & target current calculation cycle" which corresponds to the second cycle C2 of the engine vibration shown in FIGS. 7A and 7B.

Here, S1 includes both of the STG number $S1_F$ and the STG number $S1_R$ calculated in the phase detection unit 235 and is collectively referred to as "STG number S1". P'1 includes the remainder time $P'1_F$ and the remainder time $P'1_R$ calculated in the phase detection unit 235 and is collectively referred to as the "remainder time P'1".

In step S5, the target current calculation unit 236 is controlled by the timing control unit 230 to calculate target current waveforms of the first cycle C1 of the engine vibration for both of the front and rear side active control mounts. This calculation is also executed in the "ENG vibration estimating calculation & target current calculation cycle" which corresponds to the second cycle C2 of the engine vibration shown in FIGS. 7A and 7B.

In step S6, the driving pulse control signal output-time correction unit 238 reads the crank pulse interval of the predetermined angle change (i.e. the angle change in the STG number S1) of the third cycle C3 of the engine vibration. More specifically, the crank pulse interval corresponding to the crank angle change made in the stages STG of the STG number $S1_F$ and the crank pulse interval corresponding to the crank angle change made in the stages STG of the STG number $S1_R$ are calculated to detect the termination of the stages STG of the STG number $S1_F$ and the STG number $S1_R$. This process is performed in the "target current output cycle" corresponding to the third cycle C3 of the engine vibration shown in FIGS. 7A and 7B.

In step S7, the driving pulse control signal output-time correction unit 238 is controlled by the timing control unit 230 to output the target current waveform to the driving control units 239A, 239B after the remainder time P'1 is passed from the time when the stage STG of the STG number S1 is finished.

More specifically, the driving pulse control signal output-time correction unit 238 outputs the target current waveform to the driving control unit 239A after the remainder time $P'1_F$ is passed from a phase delay reference which is the time when the end of the stage STG of the STG number $S1_F$ (i.e. elapse of the STG time of the stages STG of the STG number $S1_F$) is detected for the front side active control mount $M_F$. Further, the driving pulse control signal output-time correction unit 238 outputs the target current waveform to the driving control unit 239B after the remainder time $P'1_R$ is passed from a phase delay reference which is the time when the end of the stage STG of the STG number $S1_R$ (i.e. elapse of the STG time of the STG number $S1_R$) is detected for the rear side active control mount $M_F$.

In the target current output process executed in the driving pulse control signal output-time correction unit 238, as illustrated in the output example of the target current waveform for the front side active control mount $M_F$ shown in FIG. 7C and FIG. 8, the time when the STG time of the STG number $S1_F$ is passed is referred to as the "phase delay reference". In FIG. 7C and FIG. 8, the case where the STG number $S1_F$=1 is illustrated.

A process for adjusting the phase delay can be performed by outputting the target current waveform after the remainder time $P'1_F$ is passed from the phase delay reference (i.e. with the time delay δ1 which corresponds to the cycle length T3 of the third cycle C3).

More specifically, the STG time of the stages STG of the STG number $S1_F$ of the third cycle C3 is shorter than the product of the STG number $S1_F$ and the average STG time ((T1)/4) of the first cycle C1 since the engine rotation speed is increased. Thus, the phase delay is corrected in accordance with the increase of the engine rotation speed.

In the description of the method for controlling the active anti-vibration supporting device 301 (see FIG. 1) shown in FIGS. 7A to 8, the output control of the target current value Fr_ICMD for the front side active control mount in the driving pulse control signal output-time correction unit 238 is illustrated. In the driving pulse control signal output-time correction unit 238 the output control of the target current value Rr_ICMD in the rear side active control mount is also performed in the same way as the output control of the target current value Fr_ICMD for the front side active control mount.

In the process described above, the operation performed by the active anti-vibration supporting device is completed.

Step S1 shown in the flowchart corresponds to "a reading step" recited in claims and Steps S2 to S5 correspond to "a calculation step" recited in Claims. Further, Steps S6, S7 correspond to "an outputting step" recited in Claims and step S7 corresponds to "a phase adjusting step" recited in Claims.

Figure 9:
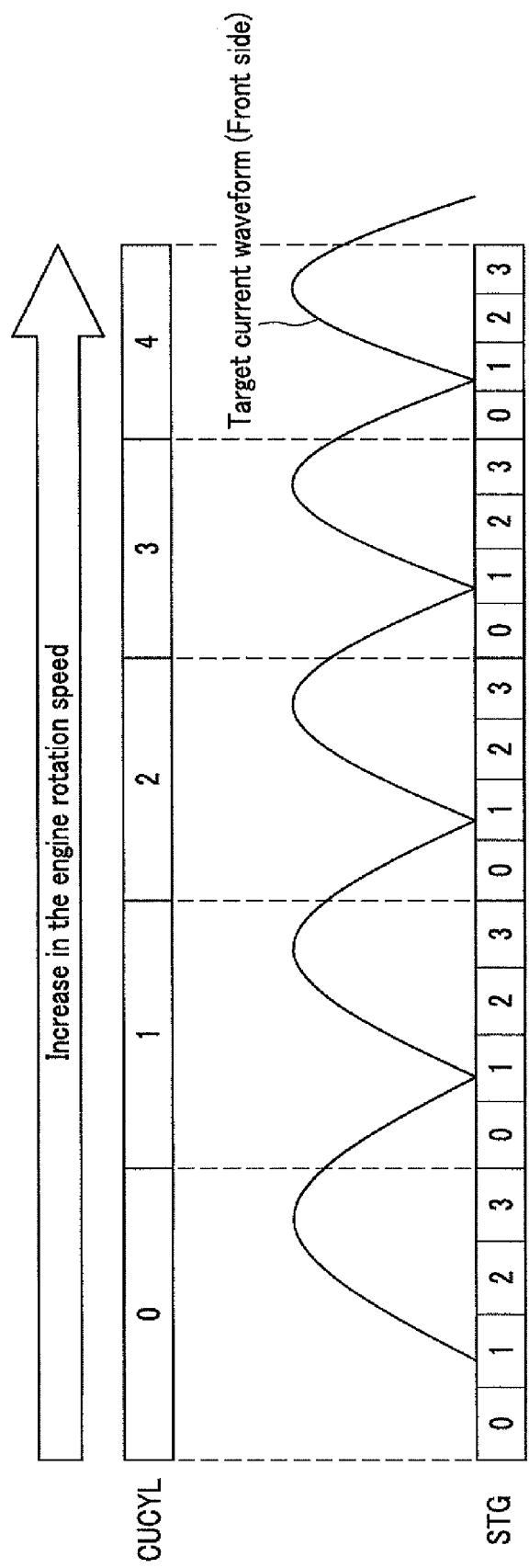
FIG. 9 is an illustration showing the output of the front side target current waveform at the time when the engine rotation speed is increased over the 5 cycles of the engine vibration.

FIG. 9 is an illustration showing the output of the target current waveform for the front active control mount when the engine rotation speed is increased over the 5 engine vibration cycles.

The phase delay $P1_F$ (see FIGS. 7A to 7C) in the first cycle C1 of the engine vibration whose length is the cycle length T1 calculated in the phase detection unit 235 is corrected to be a phase delay (a timing for driving an actuator) which is adjusted in accordance with the cycle length T3 of the third cycle C3 of the engine vibration as described above. With this configuration, the consecutive target current waveforms can be prevented from being overlapped with each other. In short, when the engine rotation speed is increased, the target current waveform is output at a phase delay which is shorter than the phase delay $P1_F$ (see FIGS. 7A to 7C) calculated in the phase detection unit 235.

In the description referring to FIGS. 7A to 9, a case is described in which the engine rotation speed is increased. The output of the target current waveform for the front side active control mount is described below as an example in the case where the engine rotation speed is decreased. As the engine rotation speed is decreased, the STG time of the stages STG of the STG number $S1_F$ of the third cycle C3 is longer than the product of the STG number $S1_F$ and the average STG time ((T1)/4) of the first cycle C1. Therefore, in the case where the engine rotation speed is decreased, the phase delay is corrected in accordance with the speed decrease.

In the embodiment, by using the average STG time ((T1)/4) of the first cycle C1 when calculating the STG number $S1_F$, the remainder time $P'1_F$, the STG number $S1_R$ and the remainder time $P'1_R$, it is possible to calculate the stable STG number $S1_F$, remainder time $P'1_F$, STG number $S1_R$ and remainder time $P'1_R$ regardless of whether the engine rotation speed is decreased or increased.

《 Modification》

Next, a modification of the embodiment is described with reference to FIGS. 3, 7A, 7B, 7C, 10 and 11. The difference between the embodiment described above and the modification is that the remainder times $P'1_F$, $P'1_R$ are also corrected in the driving pulse control signal output-time correction unit 238 in the modification.

Figure 10:
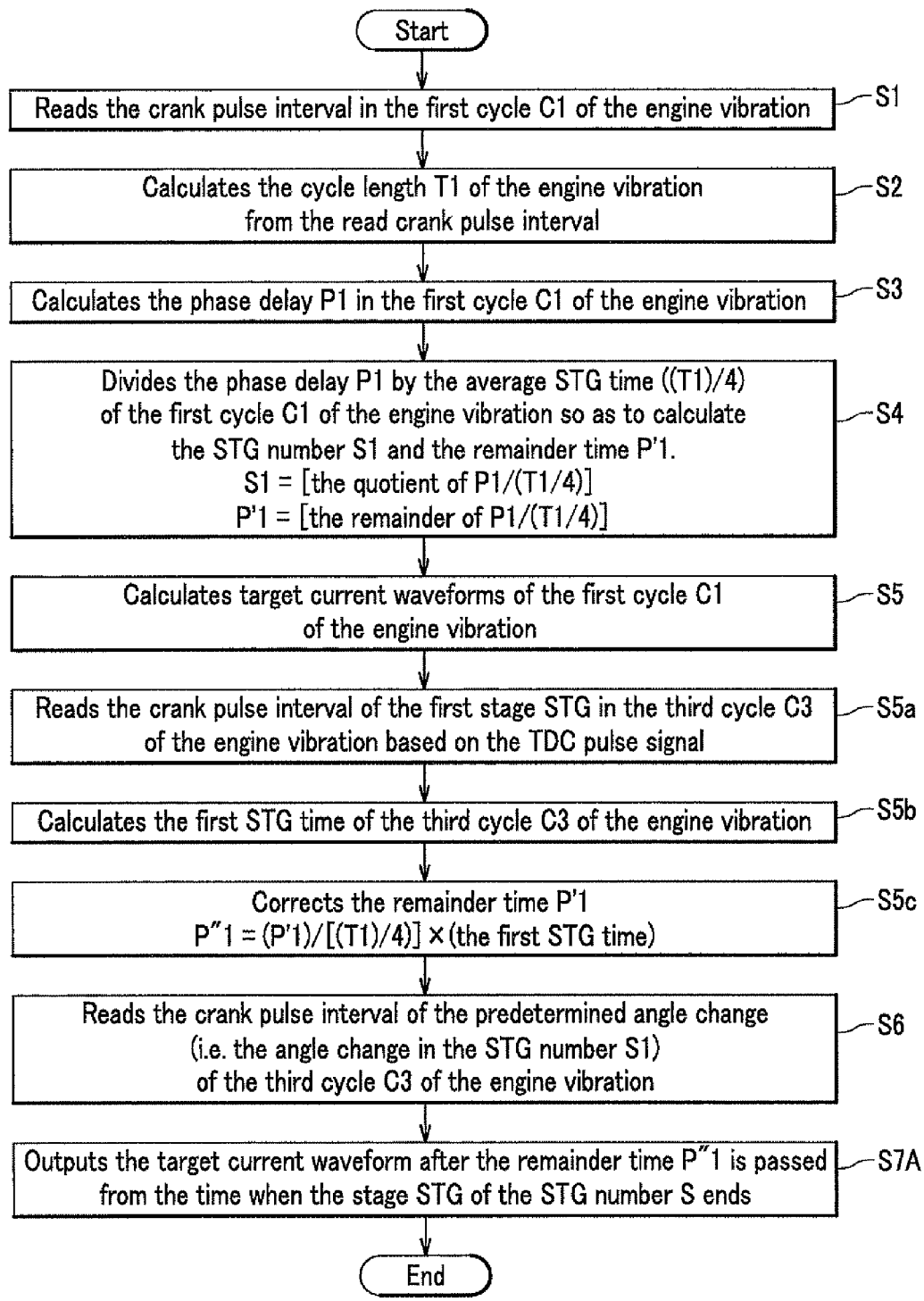
FIG. 10 is a flow chart showing the processing flow of the anti-vibration control in a modification of the present invention.
Figure 11:
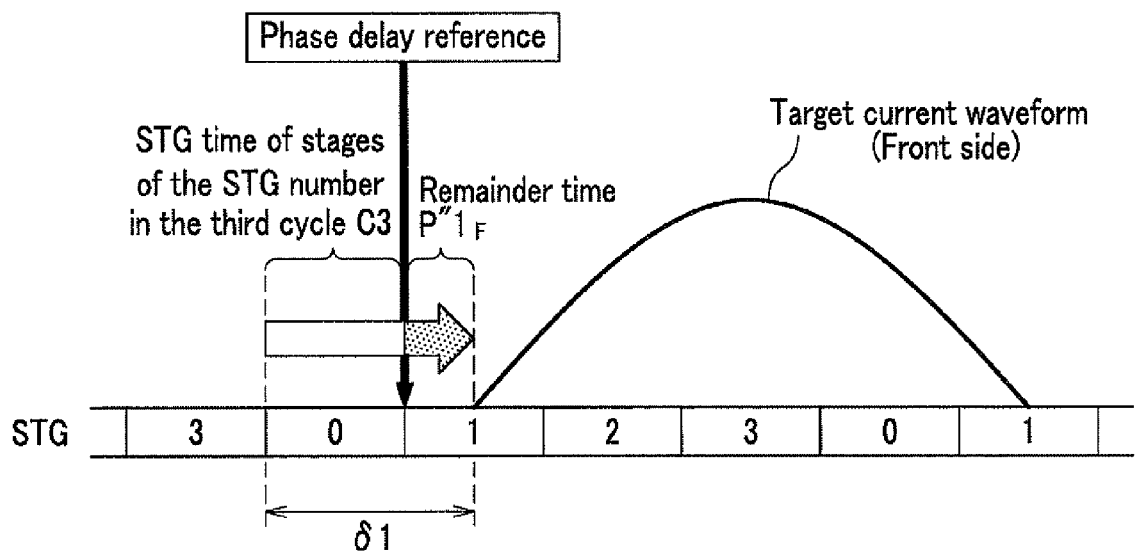
FIG. 11 is an illustration for explaining the output control of the front side target current waveform in the target current output cycle in the modification of the present invention.

FIG. 10 is a flowchart showing a control flow for isolating vibration in the modification. FIG. 11 is an illustration describing in detail the output control of the target current waveform for the front side active control mount in the target current output cycle in the modification. Steps of the flowchart shown in FIG. 10 which are the same as the steps in the embodiment are assigned similar step numerals, and repeated explanation thereof will be omitted. Processing in steps S5a, S5b, S5c, S6, S7A described later are all performed in the driving pulse control signal output-time correction unit 238 in the "target current output process cycle" corresponding to the third cycle C3 of the engine vibration shown in FIGS. 7A and 7B.

After step S5 the processing proceeds to step S5a in which the driving pulse control signal output-time correction unit 238 reads the crank pulse interval of the first stage STG in the third cycle C3 of the engine vibration based on the TDC pulse signal and the crank pulse signal from the engine ECU 100.

In Step S5b, the first STG time of the third cycle C3 of the engine vibration is calculated. The first STG time is a time length of the first stage STG whose stage number is "0" in the third cycle C3 (see FIGS. 7A to 7C). The first STG time can be measured in the micro computer 200b (see FIG. 3) by using the clock pulses.

Here, the first STG time corresponds to "a third predetermined time determined by the engine rotation speed" recited in Claims.

In step S5c, the driving pulse control signal output-time correction unit 238 corrects the remainder time P'1 calculated in step S4 to calculate the corrected remainder time P'''1.

More specifically, $P'''1 = (P'1)/[(T1)/4] \times$ (the first STG time) is calculated.

Here, the remainder time P'1 includes both of the remainder time $P'1_F$ and the remainder time $P'1_R$ calculated in the phase detection unit 235 (refer to FIG. 3) and is collectively referred to as "the remainder time P'1". Further, the corrected remainder times $P'''1_F$, $P'''1_R$ are collectively referred to as "a corrected remainder time P'''1". In short, $P'''1_F = (P'1_F)/[(T1)/4] \times$ (the first STG time), and $P'''1_R = (P'1_R)/[(T1)/4] \times$ (the first STG time).

In step S6, the crank pulse interval of the predetermined crank angle change (the STG number S1) in the third cycle C3 of the engine vibration is read.

In step S7A, the target current waveform is output to the driving control units 239A, 239B after the corrected remainder time P'''1 is passed from "the phase delay reference" which is the time when the stage STG of the STG number S ends.

More specifically, the driving pulse control signal output-time correction unit 238 outputs the target current waveform to the driving control unit 239A (see FIG. 11) for the front side active control mount $M_F$ after the corrected remainder time $P'''1_F$ is passed from the phase delay reference which is the time when end of the stage STG of the STG number $S1_F$ (i.e. the time when the STG time of the STG number $S1_F$ is passed) is detected.

Further, the driving pulse control signal output-time correction unit 238 outputs the target current waveform to the driving control unit 239B (see FIG. 11) for the rear side active control mount $M_R$ after the corrected remainder time $P'''1_R$ is passed from the phase delay reference which is the time when the end of the stage STG of the STG number $S1_R$ (i.e. the time when the STG time of the STG number $S1_R$ is passed) is detected.

In accordance with the modification, by using the remainder times $P'''1_F$, $P'''1_R$ which are obtained by correcting the remainder times $P'1_F$, $P'1_R$ by the ratio of the first STG time of the third cycle C3 of the engine vibration and the average STG time of the first cycle C1 of the engine vibration, the respective target current waveforms for the front and rear side active control mounts are output after the corrected remainder times $P'''1_F$, $P'''1_R$ are passed from the phase delay reference. As a result, respective target current waveforms for the front and rear active control mounts can be output at more accurate phase delays which correspond to the cycle length T3 of the third cycle C3 of the engine vibration in which target current waveforms are output, and thus the consecutive target current waveforms can be prevented from being overlapped.

Further, the phase delays δ1, δ2 (see FIGS. 4A to 4D) can be more accurately corrected in accordance with the increase and the decrease of the engine rotation speed.

In the modification, the remainder times $P'1_F$, $P'1_R$ are corrected by the ratio of the first STG time of the third cycle C3 of the engine vibration and the average STG time of the first cycle C1 of the engine vibration, however, the correction of the remainder times $P'1_F$, $P'1_R$ is not limited to this. The remainder times $P'1_F$, $P'1_R$ may be corrected by the ratio of the first STG time of the third cycle C3 of the engine vibration and the first STG time of the first cycle C1 of the engine vibration, for example.

DESCRIPTION OF REFERENCE NUMERALS

41 Driving unit (actuator)
100 Engine ECU (engine control device)
100a, 200a ECU power circuit
100b Micro computer
200 ACM_ECU (Control unit)
200b Micro computer
230 Timing control unit (phase delay correction unit)
231 CRK pulse reading-time temporal storage
232 CRK pulse interval calculation unit
233 Engine rotation mode determination unit
234 Vibration state estimation unit (vibration state estimation unit)
235 Phase detection unit (phase delay parameter calculation unit)
236 Target current calculation unit (target current calculation unit)
237 Driving pulse control signal generation unit
238 Driving pulse control signal output-time correction unit (phase delay correction unit)
239A, 239B Driving control unit
301 Active anti-vibration supporting device
M, $M_F$, $M_R$ Active control mount
Sa Crank pulse sensor
Sb TDC sensor

The invention claimed is:

1. An active anti-vibration supporting device which supports an engine in a vehicle body and in which a control unit for estimating vibration state based on an output from a sensor detecting a rotation variation of the engine drives to extend or contract an actuator to suppress transmission of vibration, wherein the control unit:
    calculates a target current waveform for suppressing the transmission of the vibration of the engine by using output data from the sensor;
    calculates a phase delay of a timing of outputting the target current waveform for suppressing the engine vibration using the output data from the sensor;
    divides the calculated phase delay by a first predetermined time determined by an engine vibration cycle to calculate its quotient and remainder time;
    adjusts the first predetermined time based on another engine vibration cycle in which a driving timing of the actuator is set;
    sets a second predetermined time as a phase delay reference, wherein the second predetermined time is a product of the adjusted first predetermined time and the quotient; and
    outputs the target current waveform after a period of time equal to the remainder time is passed following the phase delay reference.

2. The active anti-vibration supporting device according to claim 1, wherein the control unit comprises:

a vibration state estimation unit which estimates an amplitude and a cycle of the engine vibration by using the output data from the sensor which detects the rotation variation of the engine;

a target current waveform calculation unit which calculates the target current waveform for driving the actuator based on the amplitude and the cycle estimated by the vibration state estimation unit;

a phase delay calculation unit which calculates the phase delay of the engine vibration by using the amplitude estimated by the vibration state estimation unit and the output data from the sensor;

a phase delay parameter calculation unit which divides the phase delay of the engine vibration calculated in the phase delay calculation unit by the first predetermined time determined by the engine vibration cycle to calculate its quotient and remainder time; and a phase delay correction unit which outputs the calculated target current waveform after a period of time equal to the remainder time is passed following the phase delay reference which is the second predetermined time according to the quotient and determined by the engine vibration cycle in which the driving timing of the actuator is set.

3. The active anti-vibration supporting device according to claim 1, wherein the control unit includes a control unit which measures crank pulse signals from the sensor which are based on rotation of the engine, calculates, by using data of the crank pulse signals which belong to a first vibration cycle in cycles of the engine vibration, the target current waveform fed to the actuator for isolating vibration in a second vibration cycle, and drives to control the actuator by using the calculated target current waveform in a third vibration cycle.

4. The active anti-vibration supporting device according to claim 3, wherein the control unit calculates in the second vibration cycle of the engine vibration a phase delay of the engine vibration in the first vibration cycle and the first predetermined time determined by the engine vibration cycle by using data of the crank pulse signals which belong to the first vibration cycle of the engine vibration, divides the calculated phase delay of the engine vibration in the first vibration cycle by the first predetermined time to calculate its quotient and remainder time, and outputs in the third vibration cycle of the engine vibration the calculated target current waveform after a time equal to the remainder time is passed following the phase delay reference which is the second predetermined time according to the quotient and determined by the engine vibration cycle.

5. The active anti-vibration supporting device according to claim 4, wherein the control unit calculates in the second vibration cycle of the engine vibration the phase delay of the engine vibration in the first vibration cycle and the first predetermined time determined by the engine rotation speed by using data of the crank pulse signals which belong to the first vibration cycle of the engine vibration, divides the calculated phase delay of the engine vibration in the first vibration cycle to calculate its quotient and remainder time, in the third vibration cycle of the engine vibration, calculates a third predetermined time determined by the engine vibration cycle, corrects the calculated remainder time by a ratio of the third predetermined time determined by the engine rotation speed and the first predetermined time determined by the calculated engine rotation speed, and outputs the calculated target current waveform after a time equal to the corrected remainder time is passed following the phase delay reference which is the second predetermined time according to the quotient and determined by the engine vibration cycle.

6. The active anti-vibration supporting device according to claim 1, wherein the first predetermined time determined by the engine vibration cycle corresponds to a value obtained by dividing the cycle of the engine vibration by a predetermined integral number, and the second predetermined time according to the quotient and determined by the engine vibration cycle corresponds to time taken for detecting a predetermined number of crank pulse signals.

7. A method performed in an active anti-vibration supporting device for controlling vibration isolation, comprising the steps of:

in one cycle of engine vibration cycles which are repeated in a cyclic manner, reading during the one cycle an output value of a sensor which detects a rotation variation of an engine;

calculating in the next cycle a target current waveform which is fed to an actuator for isolating the vibration and a temporarily-set phase delay time based on the output value from the sensor which has been read in the one cycle; and outputting in a cycle after the next cycle a current waveform corresponding to the target current waveform calculated in the next cycle to suppress the vibration of the engine;

wherein the steps are cyclically performed repeatedly, and the method further comprising a step of adjusting based on acceleration and deceleration of a rotation speed of the engine a phase delay by which an output timing of the current waveform corresponding to the target current waveform is determined in the step of outputting the current waveform in each cycle by dividing each cycle in stages of which number is n, and wherein in the step of calculating the target current waveform, a time length of the cycle in which the step of reading the output value of the sensor is performed is divided by the number n which is the number of stages dividing the cycle in order to calculate an average time length of one stage at the time of reading the output value of the sensor, and the calculated temporarily-set phase delay is divided by the calculated average time length of the one stage to calculate its quotient which is the number of stages and a remainder which is a remainder time, and in the step of outputting the current waveform, the phase delay in the step of outputting the current is made to be a time after time of stages indicated by the number of stages belonging to the cycle in which the outputting step is performed and the remainder time are passed.

8. The method for controlling vibration isolation according to claim 7, wherein in the step of outputting the current waveform, the remainder time calculated in the step of calculating the target current waveform is corrected by a ratio between a time length of a first stage which belongs to the cycle in which the step of outputting the current waveform is performed and the calculated average time length of the one stage when the step of reading the output value of the sensor is performed, and the phase delay in the step of outputting the current waveform is made to be a time after time of the stages of the number of stages belonging to the cycle in which the step of outputting the current is performed and the corrected remainder time are passed.

9. An active anti-vibration supporting device which supports an engine in a vehicle body and in which a control unit for estimating vibration state based on an output from a sensor detecting a rotation variation of the engine drives to extend or contract an actuator to suppress transmission of vibration, wherein the control unit:

calculates a target current waveform for suppressing the transmission of the vibration of the engine by using output data from the sensor;

calculates a phase delay of a timing of outputting the target current waveform for suppressing the engine vibration by using the output data from the sensor;

adjusts the phase delay in accordance with increase or decrease of rotation speed of the engine in a time period from an engine vibration cycle in which the phase delay is calculated to another engine vibration cycle in which the target current waveform is output; and outputs the calculated target current waveform after the adjusted phase delay is passed in the engine vibration cycle in which the driving timing of the actuator is set.

* * * * *